(12) United States Patent
Hall et al.

(10) Patent No.: US 11,516,359 B2
(45) Date of Patent: Nov. 29, 2022

(54) SYSTEMS AND METHODS FOR IDENTIFYING AND TRANSFERRING SHEETS

(71) Applicant: RIPCORD INC., Hayward, CA (US)

(72) Inventors: Kevin Christopher Hall, Hayward, CA (US); Jens Jordan Hurley, Hayward, CA (US); Jonathan Floyd Grubb, Hayward, CA (US); Joseph David Dills Hartnagle, Hayward, CA (US); Arthur Joseph Petron, Hayward, CA (US); Alex Fielding, Hayward, CA (US)

(73) Assignee: Ripcord Inc., Hayward, CA (US)

(*) Notice: Subject to any disclaimer, the term of this patent is extended or adjusted under 35 U.S.C. 154(b) by 0 days.

(21) Appl. No.: 17/345,953

(22) Filed: Jun. 11, 2021

(65) Prior Publication Data
US 2021/0377411 A1 Dec. 2, 2021

Related U.S. Application Data

(63) Continuation of application No. 17/010,287, filed on Sep. 2, 2020, now Pat. No. 11,089,175, which is a (Continued)

(51) Int. Cl.
*H04N 1/00* (2006.01)
*H04N 1/028* (2006.01)

(52) U.S. Cl.
CPC ..... *H04N 1/00785* (2013.01); *H04N 1/00702* (2013.01); *H04N 1/00716* (2013.01);
(Continued)

(58) Field of Classification Search
CPC ..... B25J 9/1697; B25J 15/0608; B65H 15/00; B65H 15/02; B65H 2301/5121;
(Continued)

(56) References Cited

U.S. PATENT DOCUMENTS 4,097,042 A * 6/1978 Rozga ............... B65H 31/36
271/224
4,488,466 A 12/1984 Jones
(Continued)

FOREIGN PATENT DOCUMENTS

CN 101665197 A 3/2010
CN 201741888 U 2/2011
(Continued)

OTHER PUBLICATIONS

Canon. Canon solutions america. Monochrome Digital Press brochure. 2015. Available at https://csa.canon.com/online/wcm/connect/csa/03bf465e-31c2-4ba1-a8b6-fee511a9117c/varioPrint-135-120-110-Brochure.pdf?MOD=AJPERES. Accessed on Mar. 27, 2017.
(Continued)

*Primary Examiner* — Negussie Worku
(74) *Attorney, Agent, or Firm* — Wilson Sonsini Goodrich & Rosati

(57) ABSTRACT

Provided are systems and methods for identifying, isolating, and/or aligning sheets. An identification system can facilitate accurate identification of a sheet by (i) vacating one or more components of the system that are not the sheet from a zone of detection, and/or (ii) determining a reference axis of the sheet. An isolation system can facilitate accurate isolation of a sheet by (i) providing targeted air flow, and/or (ii) introducing a wave into the sheet. Identification systems and/or isolation systems described herein may facilitate isolation of sheets that were previously fastened together by one or more fasteners. An alignment system can facilitate accurate alignment of a first sheet at an upstream location relative to a second sheet at a downstream location via machine learning.

20 Claims, 7 Drawing Sheets

Related U.S. Application Data continuation of application No. 16/571,387, filed on Sep. 16, 2019, now Pat. No. 10,798,261, which is a continuation of application No. PCT/US2018/023626, filed on Mar. 21, 2018.

(60) Provisional application No. 62/474,510, filed on Mar. 21, 2017.

(52) U.S. Cl.
CPC ..... *H04N 1/00721* (2013.01); *H04N 1/00726* (2013.01); *H04N 1/00734* (2013.01); *H04N 1/00748* (2013.01); *H04N 1/00774* (2013.01); *H04N 1/0282* (2013.01)

(58) Field of Classification Search
CPC ........ B65H 2553/42; B65H 2701/1829; B65H 3/0816; B65H 3/48; B65H 7/14; B65H 2701/1131; B65H 2511/30; B65H 2511/521; B65H 2511/524; B65H 2511/528; B65H 2515/50; B65H 2515/82; B65H 2553/30; B65H 2553/81; B65H 2553/82; B65H 29/125; B65H 43/06; B65H 5/062; B65H 7/02; B65H 7/06; B65H 7/18; B65H 7/20; B65H 2301/531; B65H 2404/255; B65H 2519/00; B65H 2601/324; B65H 2701/11112; B65H 2701/1714; B65H 2701/173; B65H 2701/176; B65H 29/16; B65H 3/042; B65H 3/06; B65H 3/16; B65H 3/60; B65H 5/021; B65H 1/22; B65H 2301/33214; B65H 2301/42144; B65H 2301/44256; B65H 2301/44712; B65H 2301/44732; B65H 2801/03; B65H 2801/21; B65H 29/669; B65H 3/00; B65H 3/32; B65H 31/00; B65H 31/10; B65H 31/3063; B65H 31/3072; B65H 5/24; G05B 2219/39571; G05B 19/41865; G05B 2219/2646; G05B 2219/50393; H04N 1/0032; H04N 1/00607; H04N 1/0062; H04N 1/00689; H04N 1/00702; H04N 1/00716; H04N 1/00721; H04N 1/00726; H04N 1/00734; H04N 1/00748; H04N 1/00774; H04N 1/00785; H04N 1/0282; H04N 1/00007; H04N 1/00058; H04N 1/00076; H04N 1/00087; H04N 1/00724; B60K 15/03006; B60K 2015/03039; B60K 2015/03046; B60K 2015/03315; B60K 2015/03375; B60K 2015/03381
USPC ........................................................ 358/475
See application file for complete search history.

(56) References Cited

U.S. PATENT DOCUMENTS

| | | | |
|---|---|---|---|
| 4,632,377 A * | 12/1986 | Browse ................. | B65H 83/02 271/94 |
| 4,699,365 A | 10/1987 | Smith et al. | |
| 4,814,798 A | 3/1989 | Fukae et al. | |
| 5,019,249 A | 5/1991 | Sugai et al. | |
| 5,087,027 A | 2/1992 | Acquaviva | |
| 5,093,674 A | 3/1992 | Storlie | |
| 5,203,554 A | 4/1993 | Suzuki et al. | |
| 5,274,418 A | 12/1993 | Kazami et al. | |
| 5,377,022 A | 12/1994 | Street et al. | |
| 5,458,232 A | 10/1995 | Novak et al. | |
| 5,501,571 A | 3/1996 | Van et al. | |
| 5,568,281 A | 10/1996 | Kochis et al. | |
| 5,592,576 A | 1/1997 | Hayashi | |
| 5,835,839 A | 11/1998 | Kaneda | |
| 5,847,405 A | 12/1998 | Acquaviva et al. | |
| 6,059,284 A | 5/2000 | Wolf et al. | |
| 6,074,334 A | 6/2000 | Mennie et al. | |
| 6,196,393 B1 | 3/2001 | Kruk, Jr. et al. | |
| 6,344,902 B1 | 2/2002 | Duke et al. | |
| 6,476,376 B1 | 11/2002 | Biegelsen et al. | |
| 6,574,014 B2 | 6/2003 | Mandel et al. | |
| 6,606,171 B1 | 8/2003 | Renk et al. | |
| 6,955,348 B2 | 10/2005 | Koga et al. | |
| 7,069,278 B2 | 6/2006 | Telkowski et al. | |
| 7,561,738 B2 | 7/2009 | Zou et al. | |
| 7,734,446 B2 | 6/2010 | Squibbs et al. | |
| 7,867,593 B2 | 1/2011 | Hoshino et al. | |
| 8,056,872 B2 * | 11/2011 | Kozera ................. | B23D 33/025 83/84 |
| 8,414,993 B2 | 4/2013 | Nakazono et al. | |
| 8,693,043 B2 | 4/2014 | Schmidtler et al. | |
| 9,068,920 B2 | 6/2015 | Churilla et al. | |
| 9,460,356 B2 | 10/2016 | Irons et al. | |
| 9,886,436 B2 | 2/2018 | Ghatage et al. | |
| 10,187,542 B1 | 1/2019 | Fielding et al. | |
| 10,267,750 B2 | 4/2019 | Vild et al. | |
| 10,289,930 B2 | 5/2019 | Vild et al. | |
| 10,307,982 B2 | 6/2019 | Adams et al. | |
| 10,442,644 B1 | 10/2019 | Zakharov et al. | |
| 10,542,167 B2 | 1/2020 | Fielding et al. | |
| 10,720,765 B2 | 7/2020 | Serdynski et al. | |
| 10,778,858 B2 | 9/2020 | Fielding et al. | |
| 10,798,261 B2 * | 10/2020 | Hall ...................... | B65H 15/00 |
| 10,951,786 B2 | 3/2021 | Fielding et al. | |
| 11,089,175 B2 * | 8/2021 | Hall .................... | H04N 1/00785 |
| 11,240,392 B2 * | 2/2022 | Fielding ................ | B25C 11/00 |
| 11,339,019 B2 * | 5/2022 | Hall .................... | H04N 1/00689 |
| 2002/0111960 A1 | 8/2002 | Irons et al. | |
| 2003/0168308 A1 | 9/2003 | Maier et al. | |
| 2004/0022563 A1 | 2/2004 | Maruchi et al. | |
| 2004/0187579 A1 | 9/2004 | Yabuta et al. | |
| 2004/0207707 A1 | 10/2004 | Ohashi et al. | |
| 2004/0252355 A1 | 12/2004 | Chen | |
| 2005/0006839 A1 | 1/2005 | Oomori et al. | |
| 2005/0087422 A1 | 4/2005 | Maier et al. | |
| 2005/0212200 A1 | 9/2005 | Van et al. | |
| 2005/0240376 A1 | 10/2005 | Uwatoko et al. | |
| 2005/0285323 A1 | 12/2005 | Gulbrandsen et al. | |
| 2006/0122858 A1 | 6/2006 | Miles et al. | |
| 2007/0006754 A1 | 1/2007 | Eckart et al. | |
| 2007/0018376 A1 | 1/2007 | Sano et al. | |
| 2007/0091371 A1 | 4/2007 | Sugihara | |
| 2007/0264063 A1 | 11/2007 | Sano et al. | |
| 2007/0296140 A1 | 12/2007 | Babanats et al. | |
| 2008/0004904 A1 | 1/2008 | Tran | |
| 2009/0037444 A1 | 2/2009 | Stapleton | |
| 2010/0067071 A1 | 3/2010 | Rozenfeld et al. | |
| 2010/0220343 A1 | 9/2010 | Horikawa et al. | |
| 2010/0272777 A1 * | 10/2010 | Robinson .............. | A61F 9/0017 |
| 2010/0301547 A1 | 12/2010 | Prabhat et al. | |
| 2011/0285874 A1 | 11/2011 | Showering et al. | |
| 2011/0290851 A1 | 12/2011 | Shelton, IV | |
| 2012/0003024 A1 | 1/2012 | Kaiga et al. | |
| 2012/0013957 A1 | 1/2012 | Honda | |
| 2012/0141148 A1 | 6/2012 | Ohshima et al. | |
| 2012/0251288 A1 | 10/2012 | Suzuki et al. | |
| 2013/0010321 A1 | 1/2013 | Shen | |
| 2013/0141766 A1 | 6/2013 | Iwamatsu et al. | |
| 2013/0160663 A1 | 6/2013 | De | |
| 2013/0170001 A1 | 7/2013 | Takahata et al. | |
| 2013/0236227 A1 | 9/2013 | Hirako | |
| 2013/0242355 A1 | 9/2013 | Morita et al. | |
| 2013/0307213 A1 | 11/2013 | Adachi | |
| 2014/0153070 A1 | 6/2014 | Harada et al. | |
| 2014/0168731 A1 | 6/2014 | Nakayoshi et al. | |
| 2014/0192386 A1 | 7/2014 | Ishida | |
| 2014/0341438 A1 | 11/2014 | Parkov et al. | |
| 2015/0048566 A1 | 2/2015 | Utagawa et al. | |
| 2015/0133281 A1 | 5/2015 | Hirose | |
| 2015/0186760 A1 | 7/2015 | Albrecht | |

(56) References Cited

U.S. PATENT DOCUMENTS

| | | | |
|---|---|---|---|
| 2015/0234790 | A1 | 8/2015 | Irons et al. |
| 2015/0341509 | A1 | 11/2015 | Yamada |
| 2016/0026140 | A1 | 1/2016 | Oomoto et al. |
| 2016/0170355 | A1 | 6/2016 | Heishi et al. |
| 2016/0227181 | A1 | 8/2016 | Ilic et al. |
| 2019/0100398 | A1 | 4/2019 | Nakayoshi et al. |
| 2019/0161299 | A1 | 5/2019 | Egawa et al. |
| 2019/0161301 | A1 | 5/2019 | Maeyama et al. |
| 2019/0387120 | A1 | 12/2019 | Fielding et al. |
| 2020/0079608 | A1* | 3/2020 | Hall .................. B65H 7/20 |
| 2020/0084331 | A1 | 3/2020 | Hall et al. |
| 2020/0099812 | A1* | 3/2020 | Ishii .................. B65H 7/14 |
| 2021/0058526 | A1* | 2/2021 | Hall .................. H04N 1/00689 |
| 2021/0075918 | A1 | 3/2021 | Tomii |
| 2021/0227085 | A1 | 7/2021 | Fielding et al. |

FOREIGN PATENT DOCUMENTS

| | | |
|---|---|---|
| CN | 102170507 A | 8/2011 |
| CN | 202185902 U | 4/2012 |
| CN | 102730446 A | 10/2012 |
| CN | 102741888 A | 10/2012 |
| CN | 103685840 A | 3/2014 |
| CN | 103854022 A | 6/2014 |
| EP | 0731596 A1 | 9/1996 |
| EP | 1862978 A2 | 12/2007 |
| JP | S58139939 A | 8/1983 |
| JP | S62137963 A | 6/1987 |
| JP | H03292276 A | 12/1991 |
| JP | H10194526 A | 7/1998 |
| JP | H11130297 A | 5/1999 |
| JP | 2000246668 A | 9/2000 |
| JP | 2000263470 A | 9/2000 |
| JP | 2006091980 A | 4/2006 |
| JP | 2007039113 A | 2/2007 |
| JP | 2007238252 A | 9/2007 |
| JP | 2007323501 A | 12/2007 |
| JP | 2009001359 A | 1/2009 |
| JP | 2010189169 A | 9/2010 |
| JP | 2013129521 A | 7/2013 |
| JP | 2013173618 A | 9/2013 |
| JP | 2015180981 A | 10/2015 |
| JP | 2016222451 A | 12/2016 |
| KR | 101257206 B1 | 4/2013 |
| WO | WO-2016194703 A1 | 12/2016 |
| WO | WO-2017106856 A1 | 6/2017 |
| WO | WO-2018175631 A1 | 9/2018 |
| WO | WO-2018175644 A1 | 9/2018 |

OTHER PUBLICATIONS

EP16876924.8 The Extended European Search Report dated Jul. 22, 2019.
EP18772300.2 Extended European Search Report dated Nov. 5, 2020.
EP18772475.2 European Search Report dated Nov. 23, 2020.
EP20174330.9 European Search Report dated Oct. 28, 2020.
International Search Report and Written Opinion dated May 22, 2017 for International PCT Patent Application No. PCT/US2016/067583.
Jacquin, O. et al., Self-aligned setup for laser optical feedback imaging insensitive to parasitic optical feedback. Applied optics, Optical Society of America, 2009, 48, pp. 64. <10.1364/AO.48. 000064>. Available at https://hal.archives-ouvertes.fr/hal-00951764. Accessed on Mar. 27, 2017.
Konica Minolta. Bizhub pro 1200/1051 specifications. Available at https://www.biz.konicaminolta.com/production/1200_1051/pdf/1200_1051catalog.pdf. Accessed on Mar. 22, 2017.
Panasonic Corp. Document Scanner—ToughFeed—Innovative Paper Feed Mechanism. Dated Feb. 6, 2017.
"PCT/US2016/067583 International Preliminary Report on Patentability dated Jun. 19, 2018".
PCT/US2018/023626 International Search Report and Written Opinion dated Jul. 12, 2018.
PCT/US2018/023641 International Search Report and Written Opinion dated Jul. 13, 2018.
U.S. Appl. No. 16/571,387 Notice of Allowance dated Jun. 19, 2020.
U.S. Appl. No. 16/708,700 Notice of Allowance dated Jul. 22, 2020.
U.S. Appl. No. 16/708,700 Notice of Allowance dated Jun. 1, 2020.
U.S. Appl. No. 16/708,700 Notice of Allowance dated May 14, 2020.
U.S. Appl. No. 15/383,292 Notice of Allowance dated Nov. 26, 2018.
U.S. Appl. No. 15/383,292 Office Action dated Mar. 26, 2018.
U.S. Appl. No. 15/383,292 Office Action dated Sep. 19, 2018.
U.S. Appl. No. 16/571,424 Office Action dated Jun. 15, 2021.
U.S. Appl. No. 16/251,693 Notice of Allowance dated Aug. 13, 2021.
U.S. Appl. No. 16/251,693 Notice of Allowance dated Jul. 23, 2021.
U.S. Appl. No. 16/251,693 Office Action dated Jun. 4, 2021.
U.S. Appl. No. 16/251,693 Office Action dated May 11, 2020.
U.S. Appl. No. 16/251,693 Office Action dated Nov. 30, 2020.
U.S. Appl. No. 16/571,387 Office Action dated Feb. 25, 2020.
U.S. Appl. No. 16/944,364 Notice of Allowance dated Feb. 18, 2021.
U.S. Appl. No. 16/944,364 Notice of Allowance dated Jan. 22, 2021.
U.S. Appl. No. 16/944,364 Notice of Allowance dated Nov. 30, 2020.
U.S. Appl. No. 17/010,287 Notice of Allowance dated Jun. 30, 2021.
U.S. Appl. No. 17/010,287 Notice of Allowance dated May 18, 2021.
U.S. Appl. No. 17/010,287 Notice of Allowance dated May 3, 2021.
U.S. Appl. No. 16/007,069 Notice of Allowance dated Oct. 25, 2019.
U.S. Appl. No. 16/007,069 Office Action dated Jul. 11, 2019.
Co-pending U.S. Appl. No. 17/412,508, inventors Fielding; Alex et al., filed Aug. 26, 2021.
U.S. Appl. No. 17/163,680 Notice of Allowance dated Sep. 20, 2021.
U.S. Appl. No. 17/163,680 Notice of Allowance dated Nov. 23, 2021.
Co-pending U.S. Appl. No. 17/551,803, inventors Fielding; Alex et al., filed Dec. 15, 2021.
Co-pending U.S. Appl. No. 17/812,275, inventors Hall; Kevin Christopher et al., filed Jul. 13, 2022.
Co-pending U.S. Appl. No. 17/814,605, inventors Fielding; Alex et al., filed Jul. 25, 2022.
U.S. Appl. No. 16/571,424 Notice of Allowance dated Jan. 14, 2022.
U.S. Appl. No. 17/163,680 Notice of Allowance dated Dec. 22, 2021.
CN20180033500.1 Office Action dated Jan. 24, 2022 (English Translation).
U.S. Appl. No. 17/412,508 Notice of Allowance dated Jul. 21, 2022.

* cited by examiner

SYSTEMS AND METHODS FOR IDENTIFYING AND TRANSFERRING SHEETS

CROSS-REFERENCE

This application is a continuation application of U.S. patent application Ser. No. 17/010,287, filed Sep. 2, 2020, which is a continuation application of U.S. patent application Ser. No. 16/571,387, filed Sep. 16, 2019, now U.S. Pat. No. 10,798,261, which is a continuation of International Patent Application No. PCT/US2018/023626, filed Mar. 21, 2018, which claims the benefit of U.S. Provisional Application No. 62/474,510, filed Mar. 21, 2017, each of which applications is entirely incorporated herein by reference.

BACKGROUND OF THE INVENTION

Information can often be stored on physical document files. Such physical document files may be packed away in archives, warehouses and/or vaults. Access of information stored on physical document files may be costly and time consuming. Physical documents may be disorganized. Often the documents may be stored as disorganized or non-uniform stacks. Not only can the physical documents be difficult to locate and transport, but once the physical documents have been identified, extracting the information from the physical files can also be time consuming as well.

SUMMARY OF THE INVENTION

Recognized herein is a need for systems and methods for automating identification and/or transfer of sheets.

Provided are systems and methods for identifying and/or transferring sheets. The systems and methods can individually or collectively: (1) identify one or more characteristics of a single sheet of a physical document, such as from a stack of physical documents, (2) isolate a single sheet of a physical document, such as from a stack of physical documents, and (3) align one or more sheets of physical documents, such as for scanning. The one or more characteristics can include a shape, size (e.g., dimensions), position (e.g., coordinates), orientation, thickness, and/or other characteristics of a sheet.

In some embodiments, an identification system can facilitate accurate identification of a sheet or a stack of sheets by vacating one or more components of the system that are not the sheet or the stack of sheets from a zone of detection. In some instances, an identification system can facilitate accurate identification and/or isolation of a sheet or a stack of sheets by determining a reference axis, such as a coordinate line, for the sheet or the stack of sheets, and positioning one or more components of the system relative to the reference axis. Alternatively, the identification system can determine a reference point or a reference grid having a plurality of axes.

In some embodiments, an isolation system can facilitate accurate isolation of a sheet or a plurality of sheets from other sheets or from a stack of sheets by providing targeted air flow, such as via positioning an air providing device relative to a known reference point, reference axis, or reference grid of the sheet or the stack of sheets. In some instances, an isolation system can facilitate accurate isolation of a sheet or a plurality of sheets from other sheets or from a stack of sheets by introducing a sinusoidal wave into the sheet or the plurality of sheets. Identification systems and/or isolation systems described herein may facilitate isolation of sheets that were previously fastened together by one or more fasteners.

In some embodiments, an alignment system can facilitate accurate and/or precise alignment of a first sheet to a second sheet via machine learning, wherein the first sheet is downstream of the second sheet. The alignment system can correct discrepancies (e.g., systematic error) in performance of one or more hardware of the system over time.

In an aspect, provided is a method for identifying a sheet, comprising: providing a sheet in a zone of detection, wherein one or more tools are configured to manipulate the sheet within the zone of detection; vacating the one or more tools from the zone of detection, wherein a given tool of the one or more tools is coupled to a positioning component, wherein the positioning component is capable of moving itself and the given tool coupled thereto outside the zone of detection; detecting, by a sensor, one or more characteristics of the sheet to generate sensor data, wherein the one or more characteristics of the sheet is indicative of (i) an orientation and (ii) a position of the sheet in the system; providing the sensor data to a controller; and providing, by the controller, manipulation instructions to the one or more tools to manipulate the sheet, wherein the manipulation instructions are based at least in part on the orientation and the position of the sheet.

In some embodiments, the method further comprises determining, by the controller, a reference axis of the sheet from the one or more characteristics of the sheet provided by the sensor. In some embodiments, the reference axis is determined relative to an edge of the sheet.

In some embodiments, the manipulation instructions to the one or more tools to manipulate the sheet are based at least in part on the reference axis of the sheet.

In some embodiments, the sensor is a camera. In some embodiments, the camera is an area-scan camera. In some embodiments, the sensor data comprises an image of the sheet.

In some embodiments, the one or more characteristics of the sheet are further indicative of a shape, edge, dimension, or thickness of the sheet.

In some embodiments, the method further comprises prior to detecting, illuminating the zone of detection via an illumination source. In some embodiments, the illumination source is a light emitting diode. In some embodiments, the illuminating is via a plurality of illumination sources from a plurality of different locations. In some embodiments, the plurality of illumination sources provides illumination to the zone of detection sequentially. In some embodiments, the sensor is configured to detect the zone of detection after illumination by each illumination source in the plurality of illumination sources.

In some embodiments, the one or more characteristics of the sheet comprise a shadow profile of the sheet. In some embodiments, the controller is configured to determine the orientation and the position of the sheet based at least in part on the shadow profile of the sheet.

In another aspect, provided is a method for isolating a sheet from an adjacent sheet previously fastened to the sheet, comprising: lifting the sheet by a device capable of suction, wherein a portion of a surface of the sheet is coupled to a portion of a surface of the adjacent sheet at a previous fastening location of the sheet and the adjacent sheet by an adhesive force; positioning an air providing device between the sheet and the adjacent sheet, wherein the air providing device comprises an air providing port configured to provide air along a path leading to the previous fastening location;

and providing air from the air providing port along the path to overcome the adhesive force.

In some embodiments, the air providing device is an air knife.

In some embodiments, the air providing device is configured to hold down the surface of the adjacent sheet.

In some embodiments, the air providing device comprises a plurality of air providing port, wherein each of the plurality of air providing port is configured to provide air along a different path.

In some embodiments, the adhesive force is a static friction force or a lifting force applied by the device capable of suction.

In another aspect, provided is a method for isolating a first sheet from a second sheet previously fastened to the first sheet, wherein the second sheet is adjacent to the first sheet, the method comprising: providing a backstop adjacent to a stack of the first sheet and the second sheet; lifting the first sheet by a device capable of suction, wherein a portion of a surface of the first sheet is coupled to a portion of a surface of the second sheet at a previous fastening location by an adhesive force; directing the first sheet in a linear motion towards the backstop, wherein the linear motion is interrupted by the backstop; and isolating the first sheet from the second sheet, wherein the first sheet forms a first wave and the second sheet form a second wave, wherein the first wave and the second wave have different amplitudes.

In some embodiments, the first wave and the second wave have different frequencies.

In some embodiments, the linear motion is in a direction opposite a direction of sheet transfer.

In some embodiments, the method further comprises, subsequent to isolating, transferring the first sheet, via the device capable of suction, in the direction of sheet transfer.

In some embodiments, the adhesive force is a static friction force or a lifting force applied by the device capable of suction.

In some embodiments, the method further comprises isolating the first sheet from a third sheet previously fastened to the first sheet, wherein the third sheet is adjacent to the second sheet. In some embodiments, the third sheet forms a third wave, and wherein the third wave and the first wave have different amplitudes or frequencies.

In another aspect, provided is a method for aligning a first sheet at an upstream location relative to a second sheet at a downstream location, comprising: receiving, from a sensor configured to identify one or more characteristics of a sheet, wherein the one or more characteristics are indicative of an alignment of the sheet, one or more characteristics data of the second sheet, wherein the sensor is located at the downstream location; and transmitting, to a tool configured to manipulate alignment of a sheet, one or more manipulation instructions for manipulating the first sheet, wherein the tool is located at the upstream location, and wherein the manipulation instructions are based at least in part on the one or more characteristics of the second sheet.

In some embodiments, the one or more characteristics of the sheet are indicative of an orientation, alignment, shape, edge, dimension, or thickness of the sheet.

In some embodiments, the method further comprises (i) receiving, from the sensor located at the downstream location, one or more characteristics data of the first sheet, and (ii) transmitting, to the tool located at the upstream location, a second set of manipulation instructions for manipulating a third sheet, wherein the third sheet is located upstream of the first sheet.

In some embodiments, the second set of manipulation instructions to manipulate the third sheet is less extensive than the one or more manipulation instructions to manipulate the first sheet.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION OF THE INVENTION

Figure 1:
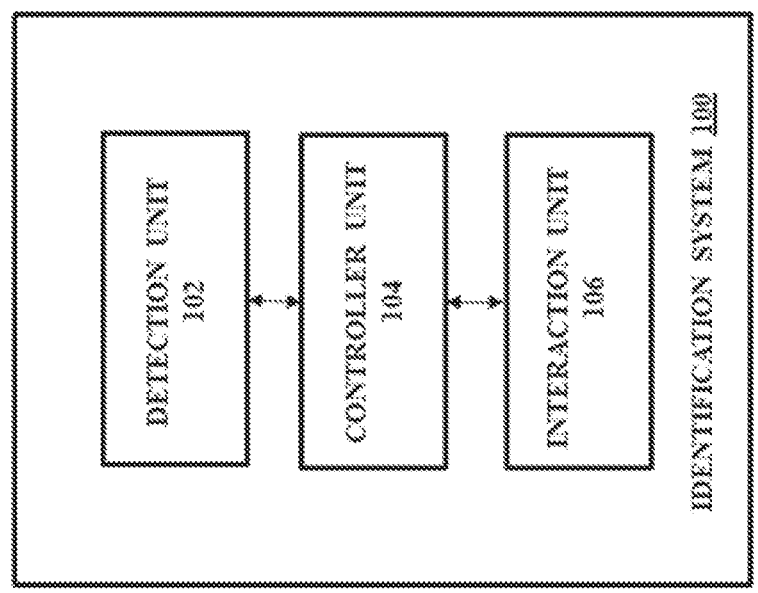
FIG. 1 shows a schematic diagram of an exemplary identification system.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "sheet" as used throughout the present disclosure can refer to a page unit of any type of document. A sheet can have any size, shape, thickness, and/or material. A document may comprise one or more sheets. The term "stack of sheets" as used throughout the present disclosure can refer to at least two sheets that are stacked together in any manner.

Immense amounts of information can be stored on physical documents, both by governmental agencies and private and public entities. Such documents can be kept in massive archives, warehouses, and/or vaults. Documents can be packaged in various manners, and/or stored within different types of containers. As an example, a Bankers Box® having a size of about 10 inches by 12 inches by 15 inches can store about 2,500 sheets to 3,000 sheets of paper or more, and weigh about 25 pounds or more. The documents may or may not have been presorted.

A stack of the documents can include documents of various sizes, shapes, thicknesses, materials. For example, one or more physical documents described herein may be of any media type. The one or more physical documents within each container may be of the same media type or may include multiple media types. Examples of media types include, but are not limited to, paper, card stock, file folders, cardboard, acetate film, polyester film, X-ray film, synthetic paper, microfiche, tissue paper, blueprints, maps, cloth, or parchment. The physical documents may include sheets, business cards, envelopes, cards, or folded documents. The physical documents may also include post-its, tabs, stickers, labels, post cards, or any other item that may be part of or added onto an existing physical document. In some embodiments, one or more, two or more, three or more, four or more, five or more, six or more, seven or more, or eight or more different media types may be provided for processing and/or subsequent digitization. The documents may have the same size or may have different sizes. For instance, the documents may have the same dimensions (e.g., width, length, thickness, diagonal, diameter, perimeter, or circumference). The documents may have the same shapes or may have different shapes. The documents may have the same alignment or orientation (e.g., landscape/portrait) or different alignments and/or orientations. The documents may be formed from the same material or different materials. The documents may have differing degrees of flexibility or the same degree of flexibility.

Additionally, the documents may or may not have fasteners attached thereto. Examples of fasteners may include, but are not limited to, staples (e.g., ferrous metal staples, plastic staples, non-ferrous metal staples), paper clips, spring binder clips, clamps, two-prong metal pot fasteners, rings, spiral rings, brads, rubber bands, rivets, grommets, pins, ties, snaps, velcro, adhesives, tapes, a combination thereof, or any other types of fasteners.

However, physical documents may be difficult to locate, access, search, and/or manipulate manually. Furthermore, it may be difficult to locate, access, search, and/or extract information from such physical documents manually. Manual methods can be costly, inefficient, unreliable and/or subject to privacy concerns. For example, human handling of large amounts of documents may be slow, prone to error, damaging to human health due to exposure to chemicals in the documents and exposure to fasteners, damaging to the documents, and/or be susceptible to security leaks when documents containing sensitive information are involved. Locating particular documents and/or transportation of such documents may be laborious and costly. Storage of information on physical documents may also be prone to loss, such as when the physical documents are lost, damaged, otherwise materially degraded (e.g., fading ink, weakened integrity of sheets, etc.), destroyed and/or mislabeled.

For at least one or more of the reasons described herein, extraction of information stored on physical documents may be difficult, thereby hindering or preventing access to an immense amount of stored information.

Systems and methods described herein can facilitate manipulation of one or more sheets such that information stored on the sheets can be subsequently digitally scanned (or otherwise imaged) and stored in digital repositories. In some instances, the systems and methods described herein can be used to facilitate other functions of machinery having sheet feed, such as copying, printing, imprinting, scanning, faxing, shredding, and/or other actions.

Conversion of the information stored on physical documents to digital information can make the information easily accessible through digital searching. The digitized information can be stored in an on-site or remote server at a secured location, and/or may be easily and reliably duplicated upon request. Digital information may be more easily searched than information stored on physical documents, and can be easily sent to a target destination. Access of digital information may not involve any human intermediaries, thereby reducing or eliminating accidental or undesired access of sensitive information to individuals without clearance or access authority. Automation of digitization of the information can improve reliability, reduce costs, and/or avoid exposure of sensitive information. An automated process can facilitate increased speed and reliability in handling large volumes of documents.

The systems and methods can be used in printing presses, copiers, scanners, and/or other machinery that requires the manipulation of one or more sheets. The systems and methods can be used and be of particular advantage for use in high throughput systems and/or high throughput machinery. Such machinery can often require single sheet feeding. Single sheet feeding processes can involve components such as vacuum cylinders, brushes, air knives, hold down foots, and/or a linear motion to successfully pick and transfer a single sheet of document. In an example, a conventional process for feeding a stack of sheets into a machine can involve elevating or de-elevating a stack of sheets in a vertical axis using an elevator, blowing air between the sheets in the stack, picking a sheet at the top of the stack using a vacuum lifter, using the vacuum lifter to pull the sheet through one or more brushes, using a hold down foot to hold down the stack of sheets below the top sheet that has been picked up, and using a linear stage to advance the sheet forward into rollers. However, such processes can often require that the stack feed be in a specific configuration, such as, for example, a uniform orientation or a uniform size of sheets in the stack or a uniform stacking of sheets (e.g., aligned edges or corners).

Manually sorting a non-uniform supply of sheets into neatly prepared stacks, such as by size, type, or orientation of sheets, before feeding the sheets into a machine can be cumbersome, tedious, and time-consuming. One or more identification systems and methods as described herein can be configured to identify a single sheet of document, such as from a stack of documents, and further identify an orientation and/or dimensions of the single sheet of document. The systems and methods can use such identification data to successfully isolate and transfer a single sheet of document from a stack of non-uniform (e.g., orientation, size, type, etc.) sheets.

Provided are systems and methods for identifying and/or transferring sheets. The systems and methods can individually or collectively: (1) identify one or more characteristics of a single sheet of a physical document, such as from a stack of physical documents, (2) isolate a single sheet of a physical document, such as from a stack of physical documents, and (3) align one or more sheets of physical documents, such as for scanning. The one or more characteristics can include a shape, size (e.g., dimensions), position (e.g., coordinates), orientation, thickness, and/or other characteristics of a sheet.

In some instances, an identification system can facilitate accurate identification of a sheet or a stack of sheets by vacating one or more components of the system that are not the sheet or the stack of sheets from a zone of detection. In some instances, an identification system can facilitate accurate identification and/or isolation of a sheet or a stack of sheets by determining a reference axis, such as a coordinate line, for the sheet or the stack of sheets, and positioning one or more components of the system relative to the reference axis. Alternatively, the identification system can determine a reference point or a reference grid having a plurality of axes.

In some instances, an isolation system can facilitate accurate isolation of a sheet or a plurality of sheets from other sheets or from a stack of sheets by providing targeted air flow, such as via positioning an air providing device relative to a known reference point, reference axis, or reference grid of the sheet or the stack of sheets. In some instances, an isolation system can facilitate accurate isolation of a sheet or a plurality of sheets from other sheets or from a stack of sheets by introducing a sinusoidal wave into the sheet or the plurality of sheets. Identification systems and/or isolation systems described herein may facilitate isolation of sheets that were previously fastened together by one or more fasteners.

In some instances, an alignment system can facilitate accurate and/or precise alignment of a first sheet to a second sheet via machine learning, wherein the first sheet is downstream of the second sheet. The alignment system can correct discrepancies (e.g., systematic error) in performance of one or more hardware of the system over time.

One or more of the systems described herein can be configured to process documents having various characteristics, including various materials, shapes, sizes, orientations, positions and/or thicknesses. A single stack can include sheets having various characteristics, including various materials, sizes, shapes, thicknesses, and/or various orientations. The types of documents which can be processed by one or more systems described herein can include, but are not limited to, legal, financial, literature, and/or historic records.

The systems and methods can be automated. The systems and methods may be incorporated into an automated end-to-end process which includes, for example, removal of documents from containers, removal of fasteners from documents, manipulating the documents such that information stored on the documents can be extracted, extracting the information from the documents, and repackaging the documents for further processing. The automated end-to-end process may include more or fewer steps and the steps can be performed in various sequences. In some instances, one or more processes can be performed simultaneously. Alternatively, the systems and methods may be incorporated as part of non-automated (e.g., manual) processes.

FIG. 1 shows a schematic diagram of an exemplary identification system. In some instances, an identification system 100 can facilitate accurate identification of a sheet or a stack of sheets by vacating one or more components of the system that are not the sheet or the stack of sheets from a zone of detection. In some instances, the identification system can facilitate accurate identification and/or isolation of a sheet or a stack of sheets by determining a reference axis, such as a coordinate line, for the sheet or the stack of sheets, and positioning one or more components of the system relative to the reference axis. Alternatively, the identification system can determine a reference point or a reference grid having a plurality of axes.

The identification system 100 can comprise a detection unit 102, a controller unit 104, and/or an interaction unit 106. The identification system can facilitate accurate identification and/or manipulation of a first sheet from a stack of sheets. The first sheet can be a top sheet in the stack of sheets. When the identification system is presented with a target object, the controller unit can first instruct an interaction unit to vacate a detection zone for the detection unit to accurately detect the target object. The detection unit can then accurately detect the target object and transmit identification information of the target object to the controller unit. Using the identification information, the controller unit can then instruct the interaction unit to accurately manipulate (e.g., isolate) the target object. The controller unit can use the identification information to identify one or more characteristics of a sheet or a stack of sheets, such as a shape, size (e.g., dimensions), position (e.g., coordinates), orientation, a thickness, or other characteristics of a sheet or a stack of sheets. In some instances, the controller unit can determine a boundary (e.g., edges, corners, etc.) of a sheet or a stack of sheets. The controller unit can determine a reference point, reference axis, and/or reference grid of the target object based on the identification information. The reference axis can be a coordinate line. The coordinate line can be used as a reference for subsequent manipulation (e.g., isolation) of the target object.

The detection unit 102 can be configured to collect information regarding the target object to identify a single sheet of document, and/or collect information pertaining to one or more characteristics of the single sheet of document. For example, the detection unit can include one or more detector components (e.g., sensors) configured to collect information relating to the target object. The detection unit and the controller unit 104 can be communicatively coupled with one another such that the detection unit can provide the collected information to the controller unit for analysis. The detection unit can receive instructions (e.g., instructions to detect) from the controller unit. The controller unit may also be communicatively coupled with the interaction unit 106 such that the controller unit can instruct the interaction unit to perform one or more tasks prior to detection or based on the information gathered by the detection unit. For example, the interaction unit can comprise automation hardware. Automation hardware can comprise hardware such as elevators, linear stages, hold down foots, brushes, air knives, vacuum lifters, and/or other tools or other positioning components. The interaction unit can be configured to receive instructions from the controller unit and perform one or more tasks to enable identification of the single sheet of document and/or transfer of one or more sheets.

Although the detection unit 102, the interaction unit 106, and the controller unit 104 are described herein as being a part of one system, it will be understood that each unit can be a part of separate systems. For example, collecting information regarding a document can be automated using a system independent from an automated system configured to interact with the document. Similarly, the controller unit can be part of an independent system.

A target object can be presented to the identification system 100 for processing. The target object may be presented to the identification system manually by an operator of the system and/or via an automated process. The identification system can be configured to receive the target object presented in various forms. The target object may comprise one or more documents. For example, the target object can be a single sheet of document, a plurality of sheets of documents, a single stack of documents, and/or a plurality of stacks of documents. Alternatively or in addition, the target object can be a plurality of sheets that are presented as a stack, pile, or any other compilation or bundle of sheets. The plurality of sheets can include sheets having various characteristics, including various materials, sizes, shapes, thicknesses, and/or various orientations.

The target object may be presented in a container, such as a tray, a box (e.g., Bankers Boxes®), a bin, and/or a folder. For example, a container containing a stack of sheets can be loaded onto a receiving port of the identification system 100 and the container can be moved by the system to a desired height to transfer one or more of the documents from within the container for processing. The system may comprise one or more mechanical components to move the container vertically and/or laterally, such as via tracks and/or an elevating platform over which the container is placed. A desired height of the container can be predetermined and/or determined using one or more sensors known to one skilled in the art. In some instances, the target object may be presented without any type of container.

The target object may or may not be pre-sorted. For example, a plurality of document sheets can be vertically stacked without any particular sequence or uniformity (e.g., orientation of sheets, dimensions of sheets, etc.) in the stacking. In some instances, the document stack may be pre-sorted into uniform stacks.

Any description herein of a stack of sheets may apply to a plurality of sheets presented in any manner. In some instances, the stack of sheets can comprise documents having a wide variety of characteristics. The stack of sheets may comprise documents of different materials shapes, sizes, orientation, and/or thicknesses. The documents may be of different types from one another. Different types of documents may have different characteristics. In some instances, one or more documents of the stack processed by the identification system 100 may be oriented differently from one or more other documents in the stack. In some instances, a stack of sheets can comprise documents having the same or substantially the same characteristics. For example, the documents can be of the same material, type, shape, size, orientation and/or thickness.

In some instances, the identification system 100 can be configured to identify and manipulate a target object that comprises paper, such as printing paper, writing paper, drawing paper, rice paper, and/or thermal paper. Alternatively or in addition, the system can be configured to identify and manipulate a target object that comprises other types of flexible material. For example, one or more sheets can be other types of flexible material, including card stock, file folders, cardboard, acetate film, polyester film, synthetic paper, microfiche, tissue paper, X-ray film, blueprints, maps, cloth, parchment, combinations thereof and/or of the like. A single sheet may comprise a single type of flexible material or multiple types of flexible materials. A stack of sheets may comprise a single type of flexible material or multiple types of flexible materials. The flexible material may have a variety of sizes and/or shapes.

A document can be any number of different types of products comprising one or more flexible material described herein. In some embodiments, a document can be a foldable card, a business card, a sheet having adhesive on at least a portion of one surface (e.g., Post-it® Note note), an envelope, a folder, a document divider, and/or a label. In some instances, the document can comprise any number of sizes, including for example, legal, letter, ledger, tabloid, A1, A2, A3, A4, B1, B2, or other standard or custom sizes of documents.

In some instances, the identification system 100 can be configured to identify a sheet of flexible material (e.g., paper) having a thickness less than about 0.3 millimeter (mm), 0.2 mm, 0.1 mm, 0.05 mm, 0.01 mm, or less. In some instances, the flexible material can have a thickness of up to about 5 mm, about 4 mm, about 3 mm, about 2 mm, or greater or less than the above. In some instances, the identification system can be configured to identify a sheet of flexible material having a thickness of about 0.01 mm to about 5 mm, including about 0.01 mm to about 4 mm, about 0.01 mm to about 3 mm, or about 0.01 mm to about 4 mm. The identification system may be capable of detecting and/or differentiating sheets having thicknesses less than any of the values described herein, greater than any of the values described herein, or falling within a range between any two of the values described herein.

In some instances, the controller unit 104 can be configured to process the information collected by the detection unit 102 to make one or more determinations described herein. As described herein, the identification system may be configured to process documents to prepare the documents for a digitization process in which information stored on the documents is extracted and stored digitally.

The detection unit 102 can comprise one or more components to sense a target object, such as a document sheet. The target object may or may not have information stored thereon. The one or more components may provide one or more of optical sensing, thermal sensing, laser imaging, infrared imaging, capacitance sensing, mass sensing, vibration sensing across at least a portion of the electromagnetic spectrum, and magnetic induction sensing. In some instances, the detection unit can comprise one or more tactile modules. A tactile sensing unit can be used to detect any anomalies (e.g., adhesives, such as a sticker) on a document or document stack. In some instances, the detection unit can be configured to provide acoustic sensing, including sensing using frequencies beyond the range of human hearing.

The detection unit 102 can be configured to use various techniques to detect and/or identify a single sheet of document. In some instances, the detection unit can be configured to contact, or achieve near contact with, the sheet to measure one or more characteristics of the sheet, such as through one or more tactile modules. In some instances, the detection unit can be configured to collect information regarding the sheet without physically contacting the sheet. In some instances, the detection unit can include one or more of an emission source and a measurement device. In some instances, the detection unit can be configured to emit a detection signal configured to probe the sheet and/or stack, including for example an electromagnetic signal and/or an acoustic signal. In some instances, the detection unit can comprise both an emission source and a measurement device. For example, the measurement device may be configured to measure an electromagnetic radiation signal emitted by and/or reflected by the sheet, due at least in part to a response of the sheet to the detection signal emitted by the emission source. As described in further details herein, the detection unit may comprise one or more components for a photometric stereovision system. In some instances, the detection unit can comprise a measurement device to collect information regarding the sheet without or substantially without emitting any detection signals for the measurement. For example, as described in further details herein, the detection unit may comprise one or more components for an infrared sensor and/or an inductive sensor.

In some instances, the detection unit 102 may comprise an illumination source configured to illuminate the document or document stack with one or more types of electromagnetic radiation. In some instances, the electromagnetic radiation can include illumination in one or more of the visible spectrum, infrared spectrum, the ultraviolet spectrum, and ionizing radiation spectrum. In some instances, the ionizing radiation can include x-rays.

In some instances, the detection unit 102 may be configured to illuminate a document or stack of documents for analysis using photometric stereovision. The detection unit may be configured to provide information to enable determining three-dimensional (3-D) information relating to the target material. In some instances, the detection unit may be configured to obtain information to determine a boundary of a sheet of document. In some instances, the detection unit can be configured to enable edge detection of a sheet of document (for example determined by the controller unit 104). Through one or more sensors and one or more detection techniques described herein, the detection unit 102 may enable identification of coordinates and dimensions of every top sheet of a stack of sheets.

In some instances, the controller unit 104 may, from the information (e.g., boundaries, dimensions, coordinates, orientation, etc.) collected by the detection unit, determine a reference point, reference axis, and/or reference grid (e.g., having a plurality of reference axes) of the target object. The reference axis can be a coordinate line of the target object. The controller unit 104 can instruct the interaction unit 106 relative to the coordinate of the target object to manipulate the target object. The system 100 may determine a coordinate line for every top sheet of a stack of sheets. In some instances, the coordinate line can be substantially parallel to at least an edge of the top sheet. In some instances, the coordinate line can be substantially perpendicular to at least an edge of the top sheet. In some instances, the coordinate line (or reference axis) can be at a predetermined angle with at least an edge of the top sheet for every top sheet. In some instances, the system may determine a plurality of coordinate lines for each top sheet of a stack of sheets. For example, the system may determine and/or provide a different coordinate line for different tasks to be performed by the interaction unit.

Referring again to FIG. 1, the interaction unit 106 may be configured to perform various tasks to manipulate a sheet, or a stack of sheets. The interaction unit may comprise one or more tools configured to perform such tasks. The interaction unit can comprise automation hardware, such as air knives, brushes, hold down foots, linear actuators, and/or vacuum lifters. In some instances, the interaction unit may comprise one or more positioning components for coupling to the one or more tools, for example, to facilitate moving the one or more tools to a desired location and/or orientation. For example, the one or more positioning components may comprise one or more mechanical arms for bringing the one or more tools towards, or away from, the sheet or stack of sheets and/or orienting the one or more tools relative to the sheet or stack of sheets. The one or more positioning components can be part of a linear gantry comprising one or more linear actuators. In some instances, the one or more positioning components may comprise one or more robot arms.

One or more positioning components can be coupled, such as detachably coupled, to appropriate tools for performing desired tasks. A single tool can be coupled to a single positioning component. Alternatively or in addition, a plurality of tools can be coupled to a single positioning component. Alternatively or in addition, a single tool can be coupled to a plurality of positioning components. As an example, a vacuum lifter can be coupled to a linear actuator or a robot arm for lifting of a top sheet from a stack. In another example, a vacuum lifter can be coupled to a plurality of positioning components (e.g., both a linear actuator and a robot arm, two robot arms with different freedoms of movement, etc.). In yet another example, a first set of a plurality of vacuum lifters can be coupled to a linear actuator and a second set of a plurality of vacuum lifters can be coupled to a robot arm. In some instances, each tool (e.g., vacuum lifter) can be individually positioned via the one or more positioning components. In some instances, a set of same or different tools can be collectively positioned via the one or more positioning components. The tools may be interchangeable. For example, the one or more positioning components may be configured to switch between different tools depending on the task desired. The tools may be exchanged, swapped, detached, and/or reattached to the one or more positioning components. In some instances, the tools may not be interchangeable.

In some instances, the robot arm can be a multi-axis robot arm. In some instances, the robot arm can have two or more axes of motion. In some instances, the robot arm can be a two-axis robot arm, a three-axis robot arm, four-axis robot arm, a five-axis robot arm or a six-axis robot arm. In some instances, robot arm may be a single-axis robot arm. In some instances, the linear actuator can have one axis of linear motion. Alternatively or in addition, the linear actuator can have two axes, three axes, or more axes of linear motion.

In some instances, one or more tools of the interaction unit 106 may comprise an end effector configured to be coupled to a positioning component, such as a robot arm. In some instances, the robot arm can be configured to be coupled to one end effector at any one time. In some instances, the robot arm can be configured to be coupled to more than one end effector at any one time. In some instances, the robot arm can be configured to switch between different end effectors. For example, the robot arm can be configured to release an end effector once a task using the end effector is completed and to couple to a different end effector suited to perform a subsequent task. In some instances, the entire robot arm can be switched out.

In some instances, the interaction unit 106 can receive instructions from the controller unit 104. Alternatively or in addition, the interaction unit can receive instructions from the detection unit 102. The instructions can include manipulation instructions, such as instructions to use one or more tools, and/or positioning instructions, such as coordinate and orientation instructions for the one or more tools or for the positioning components.

In some instances, prior to operation of the detection unit 102, the controller unit 104 may give positioning instructions to the interaction unit 106 to facilitate accurate detection of the target object by the detection unit. For example, one or more components (e.g., tools, mechanical components, positioning components, etc.) of the interaction unit may interfere with detection of a sheet or a stack of sheets by the detection unit in instances where the respective presence of one or more components of the interaction unit is in a detection zone of the detection unit. For example, such presence of the interaction unit can impact the accuracy and precision of detection by interrupting a line of vision for optical detection sensors, interrupting an emission and subsequent receipt of signals (e.g., electromagnetic waves) from one or more sensors, interrupting a movement of one or more sensors, and/or interrupting an illumination path from the illumination source.

The controller unit 104 may, prior to operation of the detection unit 102, instruct the interaction unit 106 to position one or more components of the interaction unit outside a detection zone of the detection unit. The interaction unit may be configured to be capable of moving any component of the interaction unit out of a defined detection zone. The positioning components in the interaction unit may be capable of moving any tool out of the detection zone, and further be capable of moving themselves (e.g., the positioning components) out of the detection zone.

The detection zone can vary with the type of sensor and/or technique being used to detect the sheet or the stack of sheets. For example, if a sheet or a stack of sheet is detected by analyzing one or more shadows captured by an image capturing device (e.g., camera), the detection zone can comprise any area, space, or volume where a component can cast a shadow captured by the image capturing device. The detection zone can vary with the size of the sheet or stack of sheets. In some instances, the detection zone can comprise an air space above a perimeter of at least about 2 m, 1 meter (m), 0.9 m, 0.8 m, 0.7 m, 0.6 m, 0.5 m, 0.4 m, 0.3 m, 0.2 m, 0.1 m, 9 centimeters (cm), 8 cm, 7 cm, 6 cm, 5 cm, 4 cm, 3 cm, 2 cm, 1 cm, 0.5 cm, 0.1 cm, or a shorter or longer distance from any edge or corner of a target object, a sheet, and/or a stack of sheets. The air space can have a height of at least about 5 m, 4 m, 3 m, 2 m, 1 m, 0.9 m, 0.8 m, 0.7 m, 0.6 m, 0.5 m, 0.4 m, 0.3 m, 0.2 m, 0.1 m, 9 centimeters, 8 cm, 7 cm, 6 cm, 5 cm, 4 cm, 3 cm, 2 cm, 1 cm, 0.5 cm, 0.1 cm, or a shorter or longer distance. In some instances, the detection zone can comprise an air space above a perimeter of at least some distance (such as the examples above) from any edge or corner of a receiving port, receiving platform, or receiving tray of the identification system 100. In some instances, the detection zone can comprise an air space above a perimeter of at least some distance (such as the examples above) from any edge or corner of a container or bin containing the sheet or stack of sheets. The detection zone can include any area, space or volume required by the detection unit 102 to accurately or precisely identify a top sheet from a stack of sheets and/or identify dimensions and an orientation of the top sheet. Upon successful detection by the detection unit, the controller unit may provide instructions for the interaction unit 106 to situate to, and/or return to, a position capable of manipulation of the sheet or stack of sheets (e.g., with respect to the coordinate line), which may or may not invade the detection zone.

The interaction unit 106 may comprise one or more tools to move a sheet and/or sheet stack, such as to transfer the sheet and/or stack of sheets between a first location and a second location. In some instances, the interaction unit may comprise one or more tools to change an orientation of a sheet and/or sheet stack, such as to rotate the sheet and/or sheet stack. In some instances, the interaction unit may comprise a tool to flip over a sheet and/or a sheet stack. In some instances, the interaction unit may comprise one or more tools to isolate a sheet from another adjacent sheet or isolate a sheet from a sheet stack.

The interaction unit 106 may be configured to isolate a sheet from another sheet or isolate a sheet from a stack of sheets using various techniques, including using guidance from the detection unit 102 and/or the controller unit 104. The interaction unit may be configured to separate a sheet or stack of sheets from another sheet and/or stack of sheets into groups of sheets or single sheets. For example, the groups can include sheets by folder (e.g., by file folder and/or accordion folder), attached groups, and/or bound groups. In some instances, the interaction unit can be configured to separate a sheet or stack of sheets from one or more folders, including by opening folders (e.g., accordion folders and/or file folders) and/or removing a sheet or stack of sheets from folders. In some instances, the interaction unit can be configured to perform the separation by physically contacting the document or document stack. Alternatively or in addition, the interaction unit can be configured to perform the separation by using air pressure, such as using air pressure greater than and/or less than atmospheric pressure. Alternatively or in addition, the interaction unit can be configured to perform the separation by using gravity, such as by placing the document or document stack on a sloped plane to enable gravity to separate the document or document stack from any other documents and/or stacks of documents. In some instances, the interaction unit can comprise a mechanical roller can be used to facilitate separation using gravity. For example, the mechanical roller can be used to contact the document or document stack to facilitate the separation. Other systems and methods for isolation are described further below.

For example, a vacuum lifter can be used to pick a single sheet from a stack of sheets. In another example, air knives can be used to isolate sheets in a stack. In another example, a hold down foot can be used to hold down sheets adjacent to a top sheet (e.g., sheets below the top sheet in a stack of sheets). In another example, a linear stage or linear actuator can be used to advance the top sheet forward into one or more rollers to move the top sheet.

The controller unit 104 may provide instructions to the interaction unit 106 as to the placement and/or orientation of each tool using identification information detected by the detection unit 102. The instructions can include a coordinate line of the top sheet. The coordinate line of the top sheet can be indicative of an orientation and/or coordinates of the top sheet. For example, the coordinate line can be substantially parallel, substantially perpendicular, or tilted at a predetermined angle from at least an edge of the top sheet for each top sheet. In some instances, the coordinate line can be a reference line for one or more tools of the interaction unit. In some instances, the coordinate line can be a reference line for optimal performance of one or more tools. For example, the interaction unit 106 can align an array of vacuum lifters coupled to a linear actuator with respect to the coordinate line of the top sheet to accurately and/or effectively pick the top sheet using the array of vacuum lifters. In some instances, the controller unit may provide different coordinate lines for different types of tools. For example, the controller unit may provide a first coordinate line for a vacuum lifter, a second coordinate line for a hold down foot, and a third coordinate line for an air knife. In some instances, the controller unit may provide different coordinate lines for different types of tasks desired. In some instances, the instructions can include a coordinate point (e.g., reference point) or a coordinate grid (e.g., reference grid) having multiple axes (e.g., two axes, three axes, etc.).

The instructions provided by the controller unit 104 to the interaction unit 106 can further include coordinates and/or dimensions of a top sheet. The coordinates and/or dimensions information can be used to accurately position one or more tools relative to the top sheet. For example, using the coordinates and dimension information, the interaction unit 106 can use a vacuum lifter coupled to a robot arm to target a top sheet that cannot otherwise be reached by vacuum lifters coupled to a linear actuator. Using the coordinate line, coordinates and dimensions instructions, the interaction unit 106 may precisely and accurately interact with a sheet of any size or orientation, and positioned at any location.

In some instances, the identification system 100 may be configured to provide documents for further processing, such as scanning the documents such that information stored thereon can be extracted. For example, information on the documents may be extracted using one or more optical scanning techniques. One or more character recognition algorithms can be applied to convert the information into digital format. In some instances, information from the documents can be extracted using an optical character recognition (OCR) process.

The identification system 100 can enable fully automated identification of single sheets of documents. The identification system can be a part of an assembly line configured to enable automated digitization of information stored on physical documents. In some instances, each of the detection unit 102 and the interaction unit 106 can be configured to operate without or substantially without human interaction. The detection unit and the interaction unit may be configured to operate together to fully automate identification of documents. For example, the system can be configured to process a document or document stack after receiving input from an operator to initiate the process. In some instances, the identification system can be semi-automated. For example, the system can be configured to receive periodic or intermediate input from an operator after initiation of the process. The operator may be prompted by the system during the process to input a confirmation command, and/or one or more parameters regarding the document or document process being processed. Alternatively or in addition, at any point in time, the operator may override one or more automation processes or automation algorithms. The identification system can be part of an assembly line configured to fully automate or semi-automate digitization of information stored on the document or document stack.

The controller unit 104 can be configured to control one or more other components of the identification system 100, such as to enable automation of processes to identify and/or isolate sheets of documents. The controller unit 104 may comprise one or more processors, including a central processing unit (CPU). In some embodiments, the processor may comprise a single core processor. In some embodiments, the processor may comprise a multi-core processor. In some embodiments, the controller unit comprises a plurality of processors for parallel processing. The controller unit may have one or more of a memory (e.g., random-access memory, read-only memory, and/or flash memory) and an electronic storage unit (e.g., hard disk). The electronic storage unit can be a data storage unit and/or data repository for storing data. In some embodiments, the controller unit can have a communication interface (e.g., network adapter) for communicating with one or more other components and/or systems. For example, as described in further details herein, the controller unit may be configured to communicate with one or more other components of the identification system, such as the detection unit 102 and/or the interaction unit 106. In some embodiments, the controller unit can be in communication with one or more remote systems, such as remote servers located in a different room, different building, and/or different facilities. In some embodiments, the controller unit can have one or more peripheral devices, such as cache, other memory, data storage and/or electronic display adapters. The memory, storage unit, interface and/or peripheral devices can be in communication with the processor of the controller unit through a communication bus, such as a motherboard.

The controller unit 104, such as a processor and a memory of the controller unit, can be in communication with the detection unit 102 and/or the interaction unit 106. The controller unit can be configured receive information from the detection unit, such as information collected by the detection unit relating to the target object being processed. The controller unit memory may be configured to store information received from the detection unit and/or various algorithms for performing the analyses described herein. For example, the processor of the controller unit can execute a sequence of machine-readable instructions, which can be embodied in a program or software. The instructions may be stored in a memory location, such as the memory of the controller unit. The instructions can be directed to the processor, which can be subsequently programmed or otherwise configured to implement methods of the present disclosure. Examples of operations performed by the processor can include fetch, decode, execute, and/or writeback. In some embodiments, the processor can be configured to execute the various algorithms using the information relating to the document to perform the analysis as described herein. For example, the processor can execute the various algorithms to use various information collected by one or more sensor components in the detection unit to determine the dimensions, coordinates, and/or an orientation of a sheet of document. In another example, the processor can execute the various algorithms to determine a coordinate line or other reference line using such information.

In some embodiments, the controller unit can be in communication with one or more remote servers. In some embodiments, one or more of the various analyses of information from the detection unit 102 can be performed remotely, and the analysis can then be transmitted to the controller unit 104. The controller unit can be operatively coupled to a computer network ("network") with the aid of the communication interface, such as to a wired and/or wireless network. The network can be the Internet, an internet and/or extranet, or an intranet and/or extranet that is in communication with the Internet. The network in some cases is a telecommunication and/or data network. In some embodiments, the network comprises a local area network ("LAN"), and/or a wide area network ("WAN"). The network can include one or more computer servers, which can enable distributed computing, such as cloud computing. The network, in some cases with the aid of the computer system, can implement a peer-to-peer network, which may enable devices coupled to the computer system to behave as a client or a server. In some instances, one or more operators of the system 100 can monitor and provide commands remotely.

The controller unit 104 can be configured to send instructions, based on the analyses, to the detection unit 102 and/or the interaction unit 106 to control movement of the detection unit and/or the interaction unit, so as to enable automation of the identification and manipulation process as described herein, such as to enable a fully automated or semi-automated process.

In some embodiments, the processor of the controller unit 104 can be part of a circuit, such as an integrated circuit. One or more other components of the controller unit can be included in the circuit. In some cases, the circuit is an application specific integrated circuit (ASIC). In some embodiments, the storage unit of the controller unit can store files, such as drivers, libraries and saved programs. The controller unit can store user data, e.g., user preferences and user programs. The controller unit in some cases can include one or more additional data storage units that are external to the controller unit, such as located on a remote server that is in communication with the controller unit through an intranet or the Internet. The controller unit can communicate with one or more remote computer systems through the network as described herein. For instance, the controller unit can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. In some embodiments, an operator can access the controller unit via the network.

Methods as described herein can be implemented by way of machine (e.g., computer processor) executable code stored on an electronic storage location of the controller unit 104, such as, for example, on the memory or electronic storage unit of the controller unit. The machine executable or machine readable code can be provided in the form of software. During use, the code can be executed by the processor of the controller unit. In some cases, the code can be retrieved from the storage unit and stored on the memory for ready access by the processor. In some situations, the electronic storage unit can be precluded, and machine-executable instructions are stored on memory.

The code can be pre-compiled and configured for use with a machine having a processer adapted to execute the code, or can be compiled during runtime. The code can be supplied in a programming language that can be selected to enable the code to execute in a pre-compiled or as-compiled fashion.

One or more aspects of the systems and methods provided herein, such as the controller unit 104, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit of the controller unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The controller unit 104 can include or be in communication with a user interface (UI). Examples of UI's include, without limitation, a graphical user interface (GUI) and web-based user interface. The operator may be able to input information for controlling the system using the user interface. For example, the operator may be able to enter one or more parameters using the user interface, to initiate a process and/or as part of the process, including when prompted by the system. The user interface may comprise an electronic display. The electronic display may be configured to allow an operator to view information relating to one or more components of the identification system 100, and/or one or more parameters of a process previously, currently being and/or will be completed by the system. The electronic display may enable the operator to view information gathered by the detection unit 102. In some instances, the controller unit 104 may display a graphic representation of the coordinate line on the GUI.

Although the detection unit 102, controller unit 104, and interaction unit 106 are described with reference to FIG. 1 as being distinct components of the identification system 100, it will be understood that, in some embodiments, one or more of the detection unit 102, controller unit 104, and interaction unit 106 can be a part of one component.

In some instances, one or more of a detection unit 102 and an interaction unit 106 may be a part of different systems. For example, the detection unit can be a part of a first automated system separate from and/or located at a different location from a second automated system comprising the interaction unit, and documents processed by the first automated system may be transferred to the second automated system for further processing.

Figure 2:
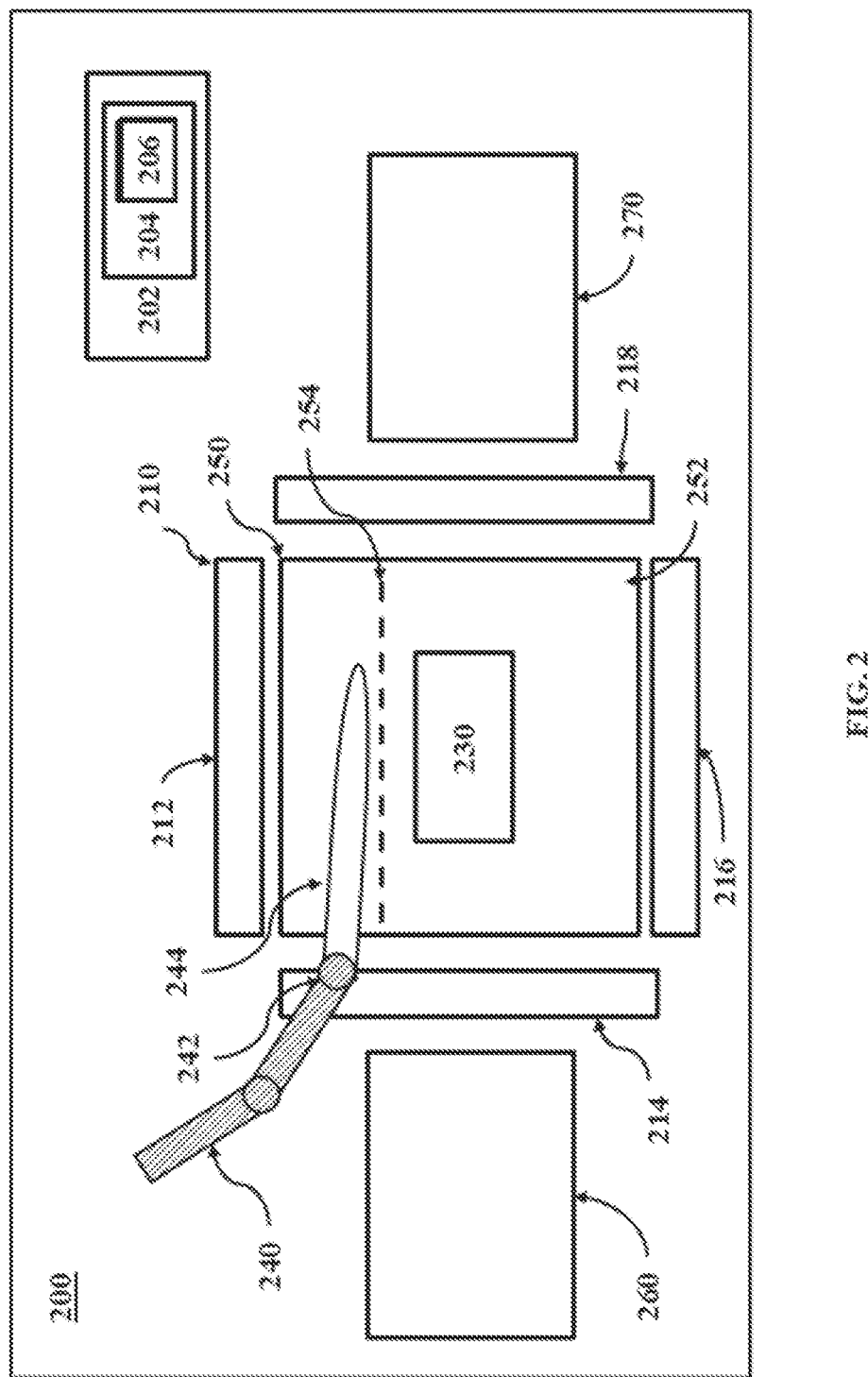
FIG. 2 shows a schematic diagram of an exemplary identification system.

FIG. 2 shows a schematic diagram of an example of an identification system. The system 200 can be an example of the identification system 100 as described with reference to FIG. 1. The system 200 can comprise an illumination source 210, an image capture device 230, a positioning component 240, a tool 244, a document pedestal 250, a first document platform 260, and a second document platform 270. The system 200 may further comprise a controller 202 in operative communication with one or more components of the system 200, such as the illumination source 210, image capture device 230, positioning component 240, document pedestal 250, first document platform 260, and/or second document platform 270, to control the one or more components and/or receive information from the one or more components for controlling the components.

In some instances, the illumination source 210 and the image capture device 230 can be components of the detection unit 102 in FIG. 1. In some instances, the positioning component 240, the tool 244, the document pedestal 250, the first document platform 260, and the second document platform 270 can be components of the interaction unit 106 in FIG. 1. In some instances, the controller 202 can be a component of the controller unit 104 in FIG. 1.

The controller 202 may comprise a processor for receiving and processing image data from an image capture device 230 and a user interface 204 to allow an operator to interact with the system 200. For example, the operator may be able to manually control one or more components of the system and/or input information for controlling the system using the user interface. The user interface can allow the operator to interact with the system. The operator may input values using the user interface to initiate and/or control a process. In some instances, the operator may input one or more values using the user interface such that the system can operate autonomously. For example, a document, document stack, multiple documents, and/or multiple document stacks can be loaded onto the system (e.g., by an operator and/or an automated process), such as onto an input port of the system, and the system may be configured to process the document without further operator input. In some instances, the operator may input one or more parameters to initiate the process and the system can be configured to complete the process fully automated without further operator intervention. In some instances, the system can be configured to receive a start instruction and the system can complete the process without further instructions from the operator.

For example, upon the operator entering a "start" command, the system can proceed to illuminate a document or document stack on the document pedestal 250 using the illumination source 210, capture a plurality of images of a document or document stack using the image capture device 230, and manipulate the document or document stack using one or more of the positioning component 240, tool 244, first document platform 260, and second document platform 270. In some instances, the system can be configured to process the document, document stack, multiple documents, and/or multiple document stacks based upon one or more parameters entered by the operator, such as one or more parameters relating to one or more characteristics (e.g., type of documents, thickness of documents, etc.) of the document, document stack, multiple documents, and/or multiple document stacks.

In some instances, the system 200 can be configured to be semi-autonomous such that the system is configured to receive input from the operator at one or more intermediate points during the operation of the system after initiation. For example, the system can be configured to prompt the operator for input to input one or more characteristics of the document, document stack, multiple documents, and/or multiple document stacks being processed, and/or confirm an operation and/or detected characteristic of the document, document stack, multiple documents, and/or multiple document stacks. For example, an operator can be requested to input a "confirm" command during one or more steps of the process before the system will proceed further. In some instances, the system can be configured to operate both in a fully automated mode and a semi-automated mode, such as based on input from an operator. In some instances, the system can be configured to allow the operator to intervene during the process, such as by inputting a "pause" and/or "stop" command. In some instances, the system can be configured to allow an operator to override one or more autonomous processes.

In some instances, the operator can manually control one or more individual components of the system using the user interface, such as one or more of the illumination source 210, image capture device 230, positioning component 240, tool 244, document pedestal 250, first document platform 260, and second document platform 270. In some instances, the user interface may be co-located with the system. In some instances, the user interface may be remote from the system, for example to enable remote operation of the system and/or remote viewing of one or more parameters of the process performed by the system. The user interface can be in a same or different room, building, and/or facility.

In some instances, the user interface 204 can include a graphical user interface (GUI) on a visual display 206. In some instances, the visual display can include a display of various parameters of the system 200, including one or more parameters of the document and/or document stack being processed. As will be described in further details herein, the visual display can be configured to display to an operator an unprocessed image, such as an image captured by the image capture device 230 and/or a processed image, such as a processed image provided by the processor of the controller 202 using information from the unprocessed image. The processed image can include a graphic representation of one or more coordinate lines 254 of a document sheet. In some instances, the visual display may display one or more status indicators of the components of the system, including status indicators of one or more of the illumination source 210, image capture device 230, positioning component 240, tool 244, document pedestal 250, first document platform 260, and second document platform 270. The visual display may be configured to display to the operator values entered by the operator or by a previous operator. The visual display may show a process history of the system.

The system 200 can be configured to identify one or more edges, orientation, dimensions, and/or coordinates of a single sheet at least in part by analyzing any shadows captured by the system. In some instances, the system can be configured to provide photometric stereovision analysis of the document or document stack. The analysis may be used to identify one or more edges, orientation dimensions, and/or coordinates of a single sheet of document.

A document pedestal 250 can be configured to receive a sheet or a stack of sheets analyzed by the system 200. For example, a sheet or a stack of sheets can be received on an upper surface 252 of the document pedestal 250. The sheet or stack of sheets can be positioned on the document pedestal manually, such as by an operator. Alternatively, the sheet or stack of sheets can be positioned on the document pedestal by an automated process. The sheets can be presented to the system 200 in various forms. In some instances, the system can be configured to receive the sheets in a container, such as a tray, a box, a bin, and/or a folder. For example, a container containing the sheets can be loaded onto a receiving port of the identification system and the container can be moved by the system to a desired height to transfer one or more of the documents from within the container to the document pedestal. The system may comprise one or more mechanical components to move the container vertically and/or laterally, such as via tracks, elevators, a linear gantry, and/or linear actuators. For example, the container can be lifted, lowered and/or moved laterally by the system to reach a desired position for transferring documents from the container to the pedestal. Once the desired position is reached, the system may be configured to automate transfer of documents from the container. As described herein, a desired height of the container can be predetermined and/or determined using one or more sensors.

The illumination source 210 can be positioned relative to the document pedestal 250 such that the sheets positioned on the document pedestal can be illuminated by the illumination source. For example, the document pedestal can be in an illumination path of the illumination source. The illumination source may be positioned at a level higher than a level of the document pedestal and oriented such that illumination from the illumination source provides a desired amount and/or angle of illumination of the document or document stack on the pedestal. The illumination source can comprise one or more illumination devices. In some instances, one or more illumination devices can face an upper surface 252 of the pedestal. In some instances, a surface of an illumination device that emits illumination can be oriented at an angle of about 30° to about 90° relative to the upper surface of the pedestal, including at an angle of about 30° to about 80°, about 30° to about 60°, about 45° to about 90°, or about 45° to about 60°. The orientation angle of the illumination source may be less than any of the values described herein, greater than any of the values described herein, or falling within a range between any two of the values described herein.

The illumination source can be positioned relative to the pedestal such that other components of the system 200 do not cast any shadow on any portion of the sheet or sheet stack positioned on the pedestal 250 when the sheet or sheet stack is illuminated by the illumination source 210. A shadow cast upon the sheet or sheet stack may result in a false positive in the identification of one or more edges of a document. In some instances, the controller 202 can instruct one or more interacting components, such as the positioning component 240 and the tool 244, to vacate a detection zone so that the interacting components do not cast a shadow on the sheet or sheet stack positioned on the pedestal when the sheet or sheet stack is illuminated. In some instances, the controller 202 can instruct one or more interacting components to vacate the detection zone so that the interacting components do not interrupt detection of the sheet or sheet stack by the image capture device 230.

The illumination source 210 can comprise a plurality of illumination modules 212, 214, 216, 218. The plurality of illumination modules may each be positioned at a different location relative to the document pedestal 250 such that the sheet or sheet stack on the pedestal can be illuminated from different angles. For example, the illumination modules can be at different locations relative to one another. Illuminating the document or document stack from different positions can allow capture of different shadow profiles of three-dimensional features, such as the edges of a single document and/or any three-dimensional objects protruding from the top of the document or document stack, such as a fastener.

In some instances, the illumination source 210 can comprise four illumination modules 212, 214, 216 and 218. The four illumination modules can be positioned over and/or surround the pedestal 250. For example, the four illumination modules can be at each of a 0° position, 90° position, 180° position and 270° position relative to the pedestal. Alternatively, the four illumination modules can be positioned differently around the pedestal. The four illumination modules can be equidistant or substantially equidistant from the pedestal to facilitate the same or similar illumination intensity by each of the four illumination modules on the pedestal. The four illumination modules can be at a variety of vertical distances from the upper surface 252 of the pedestal. The vertical distance can be selected such that the sheet or sheet stack on the pedestal is sufficiently illuminated by the illumination modules. In some instances, a vertical distance of one or more of the illumination modules from the upper surface of the pedestal can be about 4 feet (ft) to about 10 ft, including about 4 ft to about 8 ft, or about 4 ft to about 6 ft. The vertical distance of one or more of the illumination modules from the upper surface of the pedestal may be less than any of the values described herein, greater than any of the values described herein, or falling within a range between any two of the values described herein.

In other instances, a different number of illumination modules can be used. For example, fewer than four illumination modules can be used, such as three, two or one modules. In some instances, more than four illumination modules can be used, such as five, six, seven, eight, or more. The plurality of illumination modules may be positioned such that they modules are uniformly or substantially uniformly distributed radially over and/or around the pedestal 250. An illumination source comprising n number of illumination modules may have the modules at each of a multiple of 360°/n position around the pedestal. For example, a system comprising five illumination modules may comprise a module at each of a 0° position, 72° position, 144° position, 216° position, and 288° position.

As described herein, the illumination source 210 may be positioned above the document pedestal 250 and oriented such that the illumination from the illumination source provides desired illumination of the document or document stack on the pedestal. For example, each of the plurality of illumination modules of an illumination source can have an illumination emitting surface oriented at an angle of about 30° to about 90° relative to a plane of the upper surface 252 of the pedestal 250, including at an angle of about 30° to about 80°, about 30° to about 60°, about 45° to about 90°, or about 45° to about 60°. The orientation angle of the illumination modules may be less than any of the values described herein, greater than any of the values described herein, or falling within a range between any two of the values described herein.

Each of the plurality of illumination modules can comprise one or more illumination devices oriented toward the document or document stack for illuminating the document or document stack. In some instances, each of the plurality of illumination modules can comprise one or more light-emitting diodes (LEDs). The LEDs may be configured to emit light in the visible range. In some instances, the illumination modules may comprise one or more of bar lights, ring lights, and row of lights. In some instances, the illumination modules may comprise illumination devices for primary and secondary optics measurements. In some instances, the LEDs can be configured to emit light outside of the visible range (e.g., electromagnetic radiation having a wavelength in the range of about 400 nanometers (nm) to about 700 nm). In some instances, the illumination modules can comprise one or more of a fluorescent illumination, quartz halogen illumination, metal halide illumination, xenon illumination, and/or high pressure sodium illumination.

The plurality of illumination modules 210 may be illuminated individually in sequence such that one or more images of the sheet or stack of sheets on the pedestal 250 can be captured by the image capture device 230 when each individual illumination module is illuminated. The illumination modules may be illuminated in any sequence. In some instances, the illumination modules may be illuminated in a clockwise order or a counterclockwise order. Sequential illumination of the modules may be manually set and/or automatically selected, such as based on one or more system parameters and/or characteristics of the documents being processed.

The rate at which the illumination modules are activated in sequence can be optimized to increase throughput of the system 200 while allowing sufficient time for the image capturing device 230 to image the document or document stack. In some instances, the rate at which the illumination modules are illuminated can be faster than a rate which can be perceived by the human eye. The rate at which the illumination modules are activated can be selected based on one or more parameters of the image capture device, such as the speed at which the image capture device can capture an image, including for example an exposure time of the image capture device. For example, the rate of illumination can be selected based on the exposure time of a digital camera. The rate of illumination can be selected to be at least as long as the exposure time of the digital camera. In some instances, each illumination modules can be illuminated for a duration of greater than about 0.1 milli-seconds (msec), about 0.2 msec, about 0.5 msec, about 1 msec, about 5 msec, or about 10 msec. In some instances, each illumination module can be illuminated for a duration of about 0.1 msec to about 20 sec, about 1 sec to about 15 sec, about 5 sec to about 10 sec. The rate at which the illumination modules are illuminated may be less than any of the values described herein, greater than any of the values described herein, or falling within a range between any two of the values described herein.

The image capturing device 230 can be positioned above the pedestal 250 such that images of the sheet or stack of sheets on the pedestal can be captured without any obstructions. As described in more detail above, the controller 202 can instruct one or more components to vacate a zone of detection such that the image capturing device can image the sheet or stack of sheets on the pedestal without any obstructions. In some instances, the image capturing device can be positioned such that its shadow is not cast upon the sheet or stack of sheets when any of the illumination modules, such as the illumination modules 212, 214, 216 and 218, are activated. In some instances, the image capturing device can be positioned above each of the illumination modules. In some instances, the image capturing device can be equidistant or substantially equidistant to each of the illumination modules.

The image capture device 230 can be an area-scan camera. The camera can be digital or non-digital. In some instances, the image capture device can be a 5-megapixel camera. Alternatively, the camera can have resolution values other than 5 megapixels. The camera can have lower or higher resolution, such as about 3-megapixels, about 8-megapixels, or about 12 megapixels. The camera can have a resolution configured to provide accurate capture of one or more desired features of the sheet or the stack of sheets being processed. Alternatively or in addition, the image capturing device can be another type of imaging device selected based on the type of illumination source used. For example, the imaging device can be configured to detect the specific type of illumination provided by a specific type of illumination source.

The image capture device 230 can be configured to capture one or more images of a sheet or stack of sheets on the pedestal 250 each time the document or document stack is illuminated by each of a plurality of illumination sources 210, such as the plurality of illumination modules 212, 214, 216 and 218. As described herein, each of a plurality of illumination modules positioned at different locations relative to the pedestal can be activated in sequence such that images of the sheet or stack of sheets can be captured while being illuminated from different angles. The captured images can be transmitted from the image capture device to the controller 202 for analysis, for example such that a boundary of a document, and/or one or more coordinate lines 254 can be identified.

As described herein, the controller 202 may comprise a memory configured to store the information from the image capture device 230 and/or one or more algorithms used to process the information. For example, the controller can comprise one or more processors to execute machine readable instructions that can process and/or analyze one or more images captured by the image capture device 230. The controller may receive illumination configuration information from one or more illumination sources 210 to analyze an image captured while receiving illumination from the one or more illumination sources.

In some instances, the analysis performed by the controller 202 can comprise comparing a plurality of images of a sheet or stack of sheets captured by the capture device 230 to identify any shadows in any of the images. For example, the controller can be configured to perform a comparison between the images to detect any changes in the images, such as a pixel-by-pixel comparison, to identify the presence of any shadows. Shadows may be cast by one or more edges of a sheet or stack of sheets onto the upper surface 252 of the pedestal 250, and/or onto one or more other sheets and/or stack of sheets beneath the sheet or stack of sheets being processed. In some instances, the controller can be configured to generate a shadow profile of the sheet or stack of sheets using the captured images.

In some instances, the controller 202 can be configured to determine one or more characteristics of the sheet or stack of sheets based on the shadow profile. For example, a size, shape, coordinates, orientation, and/or thickness of a sheet or stack of sheets can be determined using the shadow profile. In some instances, the shadow profile can be used to identify a boundary of a document, such as one or more edges of a single sheet of paper. The controller 202 may determine one or more coordinate lines 254 for the sheet or stack of sheets based on the shadow profile and/or coordinates, orientation, and edges determined from the shadow profile.

The controller 202 can be configured to make one or more determinations regarding the sheets or stack of sheets on the pedestal 250 using one or more algorithms stored therein, including one or more pattern recognition algorithms. For example, the shadow profiles generated by the controller can be compared to one or more known and/or reference patterns to determine a size, shape, orientation, coordinates, and/or thickness of a sheet. In some instances, the controller can be configured to use the shadow profiles to determine which features in an image are three-dimensional features. In some instances, the controller can be configured to determine which of the three-dimensional features present correspond to a boundary (e.g., one or more edges, corner) of a sheet or a stack of sheets and/or which of the three-dimensional features present correspond to another characteristic (e.g., adhesion, fastener) of the sheet or the stack of sheets. The controller may be configured to disregard the three-dimensional features which do not correspond to desired characteristics of the sheet or the stack of sheets.

For example, the controller 202 can be configured to process information gathered by the image capture device 230 using one or more algorithms stored in a memory of the controller to determine whether shadows present in the images are shadows cast by features of a sheet or a stack of interest. The controller can generate instruction signals for controlling one or more components of the system to manipulate the document or document stack based on the analysis of which three-dimensional features are features of a boundary of a document, such as by providing a coordinate line 254 for the document or document stack.

In another example, the controller 202 may use one or more pattern recognition algorithms to perform one or more analyses described herein. In some instances, shadows present in the images captured by the image capture device can be compared to one or more thresholds and/or references, including known reference patterns, such as known reference patterns of flexible material and/or portions of flexible material. The controller can be configured to determine a boundary of the document, an orientation, and/or coordinates of the sheet or the stack of sheets based on the comparison. In some instances, one or more of the analysis can be performed by a controller remote from the system 200, which one or more analysis is transmitted to the controller 202 for controlling one or more components of the system, such as via wired and/or wireless networks as described herein. For example, the remote controller can be positioned at a different location in the facility from a location in which the system 200 is located, or at a facility different from that of the system 200.

As described herein, the controller 202 can be configured to send instructions to one or more of the positioning component 240, tool 244, document pedestal 250, first document platform 260, and second document platform 270 to manipulate the sheet or stack of sheets on the document pedestal. While a limited number of components is shown in FIG. 2, the identification system 200 may comprise any number of components, including a plurality of the same or different components described herein, and other automation hardware, detection hardware, illumination hardware, and/or movable or positioning components (e.g., robot arms, linear actuators, elevators, etc.).

Referring again to FIG. 2, the system 200 can comprise a positioning component 240 coupled to one or more tools 244 configured to manipulate a sheet or a stack of sheets on the document pedestal 250. The tool can be one or more automation hardware and/or one or more end effectors. For example, the tool and/or end effector can be a vacuum lifter, a hold down foot, and/or an air knife. The positioning component can be a linear actuator having one axis of linear motion or multiple axes of linear motion. Alternatively or in addition, the positioning component can be a robot arm. Alternatively, the system can comprise other movable components, such as other robot arms, linear actuators, linear stages, elevators, tracks, and/or a combination of the above. The system may comprise any combination of a plurality of different tools (e.g., vacuum lifter, hold down foot, air knife, fastener remover, etc.) and a plurality of different positioning components (e.g., robot arms, linear actuators, elevators, etc.). Any tool can be permanently or detachably coupled to a positioning component. For example, a tool 244 can be detachably coupled to a distal end (or joint) 242 of a positioning component 240 (e.g., linear actuator, robot arm). The positioning component can have a plurality of joints and be capable of movement in a plurality of axis. Alternatively or in addition, a plurality of tools can be coupled to one positioning component. Alternatively or in addition, one tool can be coupled to a plurality of positioning components.

A tool coupled to a positioning component (e., linear actuator, robot arm, etc.) may be interchanged for another tool. In some instances, a first tool can be coupled to a first type of positioning component (e.g., linear actuator) and a second tool can be coupled to a second type of positioning component (e.g., robot arm), wherein the first tool and second tool are the same type of tool (e.g., vacuum lifter). For example, the system 200 may comprise a first set of vacuum lifters coupled to a linear actuator and a second set of vacuum lifters coupled to one or more robot arms. The controller 202 may determine which set of vacuum lifters to direct to pick up a sheet based on a shape, size (e.g., dimensions), coordinates, orientation and/or thickness of the sheet determined by the controller. In some instances, the controller may direct both sets of vacuum lifters to pick up the sheet (e.g., for a large sheet). In some instances, the controller may direct the second set of vacuum lifters coupled to one or more robot arms to pick up a sheet that is determined to be out of reach by the first set of vacuum lifters coupled to the linear actuator. The controller may direct one or more tools and/or positioning components along a coordinate line 254 determined for the sheet. In some instances, the controller may determine a different coordinate line for the same sheet for performing a different task (e.g., holding down a stack of paper to isolate a top sheet of the stack of paper). Alternatively, the controller may instruct the one or more tools and/or positioning components relative to one coordinate line for each sheet.

In some instances, the controller 202 can be configured to control one or more of the first document platform 260 and the second document platform 270 for manipulating a sheet or stack of sheets being processed by the system 200. In some instances, a document platform can be a hold down foot and/or perform the functions of a hold down foot. The first and/or second platforms can be used in combination with one or more positioning components (e.g., linear actuator, robot arm, etc.). In some instances, the controller can be configured to instruct the first document platform and second document platform to lift and/or separate a sheet or a stack of sheets from any other sheet(s) or stack(s) of sheets on the pedestal 250, such as in combination with one or more tools coupled to one or more positioning components.

For example, a tool 244 (e.g., vacuum lifter) coupled to a positioning component 240 (e.g., linear actuator) can be positioned to lift a sheet or a stack of sheets from the pedestal 250, such as by using a suction force placed over at least a portion of the sheet or the stack of sheets. The controller 202 can direct at least one of the first document platform 260 and the second document platform 270 to be subsequently positioned underneath the sheet or the stack of sheets lifted by the tool coupled to the positioning component. For example, at least one of the first and second document platforms may provide an opposing force (e.g., weight) on the remaining sheets or stack of sheets below a top sheet being lifted to the lifting force (e.g., suction force). In some instances, positioning of a document platform under the top sheet may facilitate separation of the top sheet from any other sheet(s) or stack(s) of sheets on the pedestal. In some instances, the controller may direct the first and/or second document platforms to an appropriate position based on guidance form identification information of the sheet or the stack of sheets collected by one or more sensors (e.g., image capture device 230) and processed by the controller. In some instances, the controller may direct the first and/or second document platforms to an appropriate position based on one or more coordinate lines of the sheet or the stack of sheets determined by the controller.

In some instances, at least one of the first document platform 260 and the second document platform 270 can be used to manipulate a sheet or a stack of sheets on the pedestal 250, such as to flip over the sheet or the stack of sheets. For example, a flipping operation can be performed before, during, or after detection by one or more detecting sensors (e.g., image capture device 230). In some instances, the sheet or the stack of sheets can be flipped by first moving one of the first document platform or the second document platform to be positioned under the sheet or the stack of sheets, then moving the other of the first document platform or the second document platform over the sheet or the stack of sheets to sandwich (or envelope) the sheet or the stack of sheets between the two platforms. The two document platforms can be rotated around a horizontal axis to flip over the sheet or the stack of sheets between the two document platforms. The horizontal axis can be substantially parallel to a plane of the document pedestal. For example, the two platforms can simultaneously contact the sheet or the stack of sheets to securely position the sheet or the stack of sheets between the two platforms. Pressure may be exerted upon the sheet or the stack of sheets positioned between the two platforms by one, or both, of the platforms to ensure the sheet or the stack of sheets does not slip from between the platforms when the platforms are rotated.

In some instances, at least one of the first document platform 260 and the second document platform 270 can be a multi-axis component, including for example a two-axis or a three-axis component. In some instances, the system 200 may comprise only one document platform. Alternatively, the system may comprise more than two document platforms.

The first and/or second document platforms 260, 270 may be sized to accommodate the respective sizes of the sheet or the stack of sheets handled (e.g., processed) by the system 200. In some instances, a document platform may comprise a degree of roughness on a surface configured to contact the sheet or the stack of sheets, such that the surface can have desired friction with the sheet or the stack of sheets. Providing a desired degree of friction on one or more surfaces of the first and/or second platforms may facilitate manipulation of the document or document stack. The desired friction can be achieved using various techniques. For example, friction can be provided on a surface of one or both of the platforms configured to contact the document or document stack by features formed thereon, including for example various recess patterns etched into the surface. For example, the surface can be textured. In some instances, the surface can have a coating to provide the desired friction. In some instances, a material of the platform can be selected to provide the desired friction. In some instances, friction can be provided by placing additional material on the surface, such as strips of material configured to provide added friction. In some instances, a surface on one or both of the platforms configured to contact the sheet or the stack of sheets can have a coefficient of friction greater than about 0.5, about 0.6 or about 0.7. In some instances, the coefficient of friction can be from about 0.5 to about 1, including form about 0.6 to about 1, or from about 0.7 to about 1. Alternatively, the coefficient of friction can be greater or less than the above examples or range of examples.

Only one positioning component 240 is shown in FIG. 2, which positioning component can be a linear actuator, robot arm, or other movable component. In some embodiments, use of a single positioning component can reduce the footprint of the identification system 200, reduce costs of operation and/or maintenance, and/or reduce sources of possible malfunction to thereby increase system reliance. Alternatively, the system may comprise a plurality of positioning components, and/or components having degrees of freedom of movement in multiple axes, such as to increase efficiency of the system.

Figure 3:
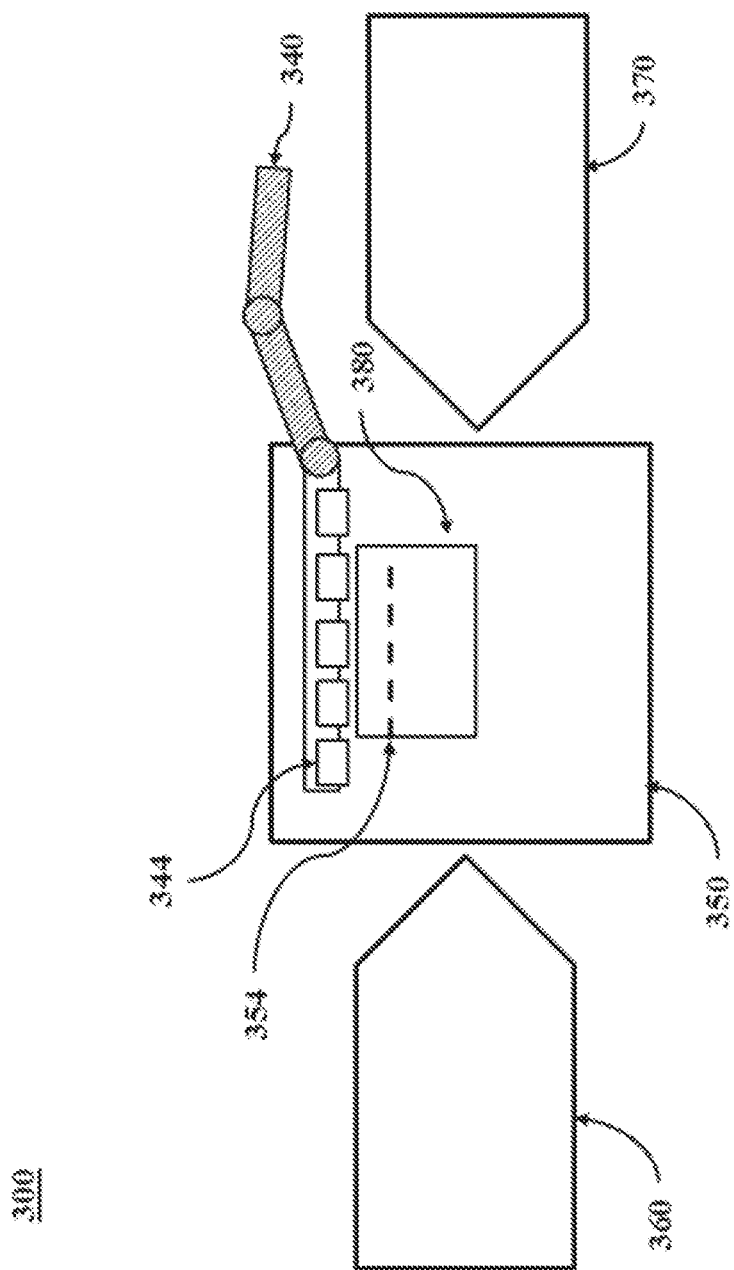
FIG. 3 shows an exemplary identification system featuring a coordinate line.

FIG. 3 shows an exemplary identification system featuring a coordinate line. The identification system 300 can comprise a document pedestal 350, a first document platform 360, a second document platform 370, a positioning component 340, and a plurality of tools 344. Components of system 300 can correspond to the respective components of system 200. For example, the document pedestal 350 can be the document pedestal 250 in FIG. 2, the first document platform 360 can be the first document platform 260 in FIG. 2, the second document platform 370 can be the second document platform 270 in FIG. 2, the positioning component 340 can be the positioning component 240 in FIG. 2, and at least a tool of the plurality of tools 344 can be the tool 244 in FIG. 2.

FIG. 3 features a coordinate line 354 for a letter size sheet. Alternatively, the coordinate line can be for a sheet of any other size (e.g., A2, A3, A4, B1, legal, etc.). The plurality of tools 344 can be an array of vacuum lifters to lift a top sheet or a plurality of sheets from other sheets or from a stack of sheets on the document pedestal 350. For example, if the system 300 identifies that a top sheet of a stack of sheets on the pedestal is a letter size sheet having a certain orientation and certain coordinates, a controller of the system can determine a coordinate line 354. The controller can direct the array of vacuum lifters via one or more linear actuators (e.g., positioning component 340) to be positioned along the coordinate line 354, and one or more vacuum lifters in the array can be used to pick up the top sheet from that position. After a suction is applied by the vacuum lifter, at least one of the first document platform 360 and the second document platform 370 can be positioned below the top sheet to hold down any remaining sheet(s) during lifting.

The identification systems (e.g., system 100, system 200, system 300, etc.) described above and to be described further below can facilitate isolation of sheets that were previously fastened together by one or more fasteners.

Figure 4:
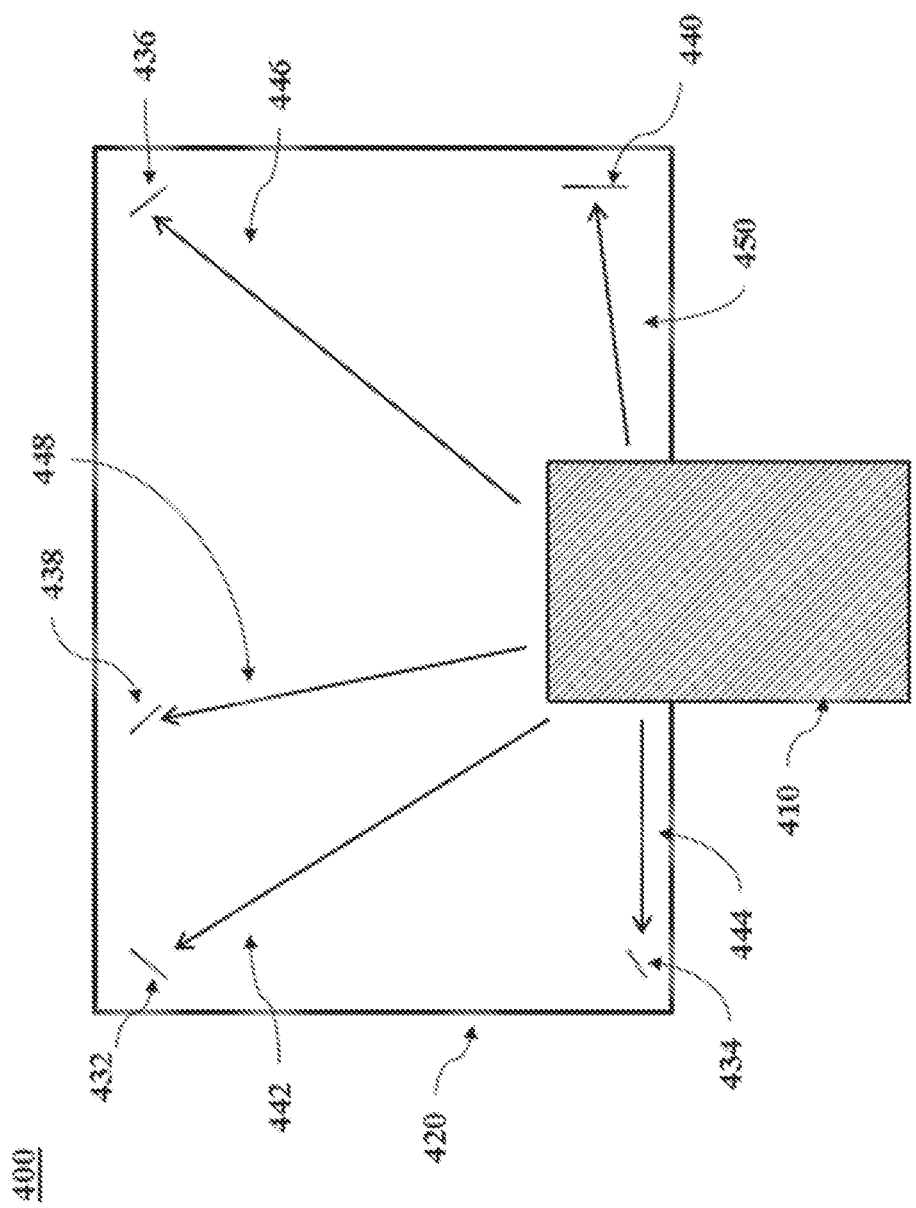
FIG. 4 shows a schematic diagram of an exemplary isolation system.

FIG. 4 shows a schematic diagram of an exemplary isolation system. The isolation system 400 can facilitate accurate isolation of a sheet or a plurality of sheets from other sheets or from a stack of sheets by providing targeted air flow, such as via positioning an air providing device 410 relative to a known reference point, reference axis, or reference grid of the sheet or the stack of sheets. The isolation system may facilitate isolation of sheets that were previously fastened together by one or more fasteners.

Two or more sheets previously fastened together by one or more fasteners may retain at least some amount of adhesive or binding forces between the two or more sheets. For example, a packet of sheets can be fastened together by a staple. The staple may be removed from the packet of sheets via manual (e.g., hand-operated staple remover), semi-automated, or automated (e.g., via machine) methods. In some instances, when a machine removes the staple from the packet, the machine can pull the staple up through all of the sheets held by the staple. In the process, the now unfastened sheets of paper can get barbed together at one or more penetration points of the staple, thus forming a secondary binding force or secondary adhesive force that binds adjacent sheets. Alternatively, a secondary binding force or secondary adhesive force can be created when other fasteners are removed, such as the removal of paper clips, spring clips, metalbrads, punched holes fasteners, rubber bands, spiral binding, binder clips, spring binder clips, bookbinding, two-prong fasteners (e.g., two-prong metal fasteners), spiral rings, ring binding, gachuck clips, plastiklip plastic clips, corner clips, butterfly clamps, owl clips, circular paper clips, papercloops, adhesives (e.g., tape), plastic staples, metal staples, non-ferrous metal staples combinations thereof and/or the like.

Because of such secondary adhesive or binding forces, when a suction is applied (e.g., via a vacuum lifter) to at least a portion of the top sheet of a stack of such previously fastened sheets, the top sheet may resist isolation from the rest of the stack, such as at previous locations of the removed fasteners on the top sheet. For example, when a portion of a front edge of the top sheet is initially picked up by a vacuum lifter, the immediate portion of the front edge can be picked up and the previous fastener locations can remain bound (e.g., by such secondary binding or adhesive force) to an adjacent sheet in the stack. In some instances, the secondary binding or adhesive force can overcome the lifting force and the vacuum lifter can untimely release the top sheet before complete isolation. In some instances, the secondary binding or adhesive force can lift more than one sheet and compromise a single sheet feeding prerequisite of a document processing system. Alternatively or in addition, forcing the lifting force on the resisting secondary binding or adhesive force can damage the top sheet and/or adjacent sheets of the top sheet in the stack, such as by ripping, bending, and/or creasing around the bound location.

In some instances, the vacuum lifter can lift the portion of the front edge of the top sheet from the stack by at most about 0.1 inches, 0.2 inches, 0.3 inches, 0.4 inches, 0.5 inches, 0.6 inches, 0.7 inches, 0.8 inches, 0.9 inches, 1 inch, 1.5 inches, 2 inches, 2.5 inches, 3 inches, 3.5 inches, 4 inches, 4.5 inches, 5 inches, or greater or less than the above examples.

As described herein, after an initial application of suction on a top sheet, a document platform (e.g., hold down foot) can be inserted below the top sheet to hold down a plurality of sheets or a stack of sheets below the top sheet. In the isolating system 400, a device 410 inserted below the top sheet after a lifting action (e.g., application of suction) is performed on the top sheet can function as both a document platform and an air providing device. For example, the device can be an air knife. The device can comprise functions of a document platform, hold down foot, air providing device, and/or an air knife. In some instances, the device 410 can be the first document platform 260 of FIG. 2 and/or the second document platform 270 of FIG. 2. For example, the isolating system 400 can be integrated as part of the identification system 100 of FIG. 1, the identification system 200 of FIG. 2, and/or the identification system 300 of FIG. 3. For example, the isolating system can share one or more controllers or controller units in the respective identification systems of FIGS. 1-3. Alternatively, the isolation system 400 can comprise an independent controller. The independent controller can be operatively and/or communicatively coupled to other controllers or controller units in the other systems.

The air providing device 410 can comprise a plurality of targeted air providing ports, wherein each port is configured to provide air along a specific path. In some instances, each specific path can be substantially parallel to a plane of the top sheet and/or substantially parallel to a plane of the sheets or stack of sheets adjacent to the top sheet. In some instances, each specific path can comprise a path from a port of the device to a specific location on a surface of a sheet adjacent to the top sheet. For example, the device can comprise a first air providing port configured to provide air along a first path 444, a second air providing port configured to provide air along a second path 442, a third air providing port configured to provide air along a third path 448, a fourth air providing port configured to provide air along a path 446, and a fifth air providing port configured to provide air along a fifth path 450. Alternatively, the device can comprise more or less air providing ports configured to provide air along a specific path. In an example, the device can comprise four air providing ports, wherein each port is configured to provide air along a path to a different corner of the four corners of a sheet. Beneficially, this may target locations (e.g., corners) of a sheet where fasteners are normally located before they are removed.

For example, a first port can be configured to provide air along a first path 444 towards a first previous fastening location 434, a second port can be configured to provide air along a second path 442 towards a second previous fastening location 432, a third port can be configured to provide air along a third path 448 towards a third previous fastening location 438, a fourth port can be configured to provide air along a fourth path 446 towards a fourth previous fastening location 436, and a fifth port can be configured to provide air along a fifth path 460 towards a fifth previous fastening location 440. The air provided can be a relatively high velocity air. A targeted air flow towards a specific location can beneficially break through a secondary binding or adhesive force (e.g., break through one or more barbs between two or more sheets) and dislodge the top sheet from an adjacent sheet at the specific location.

In some instances, a plurality of ports on the device 410 can be located radially around a distal end of the device. In some instances, a plurality of ports on the device 410 can be configured to provide air radially from a reference center, reference axis, and/or reference grid on the device. For example, In some instances, air can be provided simultaneously from all ports of the plurality of ports of the device 410. In some instances, air can be provided simultaneously from one or more selected ports of the device. In some instances, air can be provided sequentially from all ports of the plurality of ports of the device, in some order, such as in a clockwise sequence, counterclockwise sequence, or another custom sequence. In some instances, air can be provided sequentially from one or more selected ports of the device. In some instances, an identification system may be configured to identify one or more previous fastening locations, such as before the identification system removes the fasteners and/or through one or more devices and techniques (e.g., shadow analysis, 3D feature processing, etc.) described herein. For example, a controller of the system 400 can, based on the previous fastening locations, direct the device to provide air through selected ports along specific paths leading to the previous fastening locations.

Identification systems as described herein can determine and provide information on one or more characteristics of the top sheet and/or the stack of sheets to the isolation system 400, such as a thickness, position (e.g., coordinates), orientation, boundaries, size (e.g., dimensions), and/or shape of the top sheet and/or the stack of sheets, to the controller of the system 400. In some instances, the identification system(s) can provide one or more reference points, reference axes, and/or reference grids relative to the top sheet and/or the stack of sheets to the controller of the system 400. The controller of the system 400 can use such reference information to accurately position the device 410 relative to the top sheet and/or the stack of sheets 420, and thereby locate one or more edges, corners, and/or previous fastening locations on the stack of sheets or on an adjacent sheet of the top sheet.

In some instances, the top sheet and an adjacent sheet to the top sheet can be bound by other binding or attractive forces. For example, the top sheet and the adjacent sheet can be bound by a static friction force (e.g., stiction, electrostatic forces, Van der Waals intermolecular forces, etc.) between the contacting surfaces of the two sheets. In another example, the top sheet and the adjacent sheet can be bound by a lifting force (e.g., applied via suction from a vacuum lifter) that bleeds through the top sheet to the adjacent sheet. In another example, the top sheet and the adjacent sheet can be bound by a crease, fold, or other structural deformations in either sheet that couples to the other sheet. In another example, the top sheet and the adjacent sheet can be bound by adhesive elements (e.g., glue, adhesive liquids, etc.) remaining on a contacting surface of either of the two sheets. The isolation systems (e.g., system 400 and system 500 described below) can be used to overcome other binding or attractive forces described herein to facilitate isolation of two or more sheets.

Figure 5:
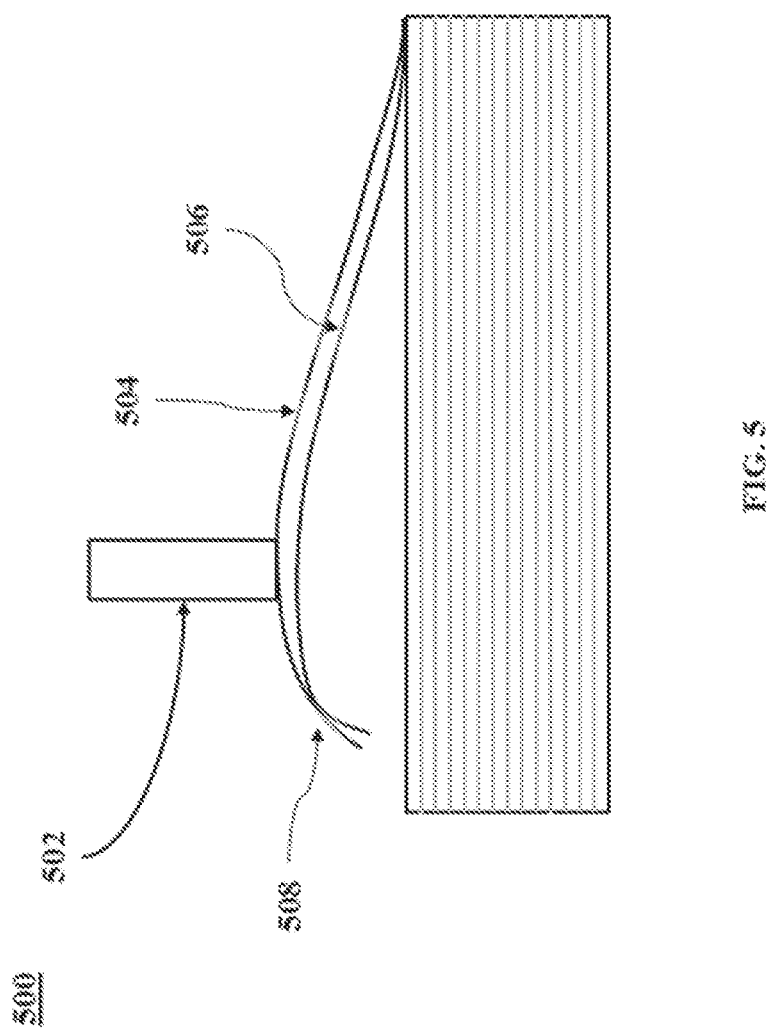
FIG. 5 shows an exemplary cross-sectional side view of a top sheet and an adjacent sheet to the top sheet connected by a secondary binding or adhesive force after an initial lifting force has been applied to the top sheet.

FIG. 5 shows an exemplary cross-sectional side view of a top sheet and an adjacent sheet to the top sheet connected by a secondary binding or adhesive force after an initial lifting force has been applied to the top sheet. For example, a top sheet 504 and an adjacent sheet 506 to the top sheet can have been previously fastened together via a fastener at a fastening location 508. In an isolation system 500, when an initial lifting force has been applied to the top sheet 504 by a vacuum lifter 502 or other suction applying device, the top sheet 504 and the adjacent sheet 506 are connected by a secondary binding or adhesive force at the previous fastening location 508. In some instances, the secondary binding or adhesive force can be overcome by the systems and methods described above and/or further below. In some instances, the secondary binding or adhesive force can originate from other sources (e.g., stiction, vacuum bleed through, etc.).

Figure 6:
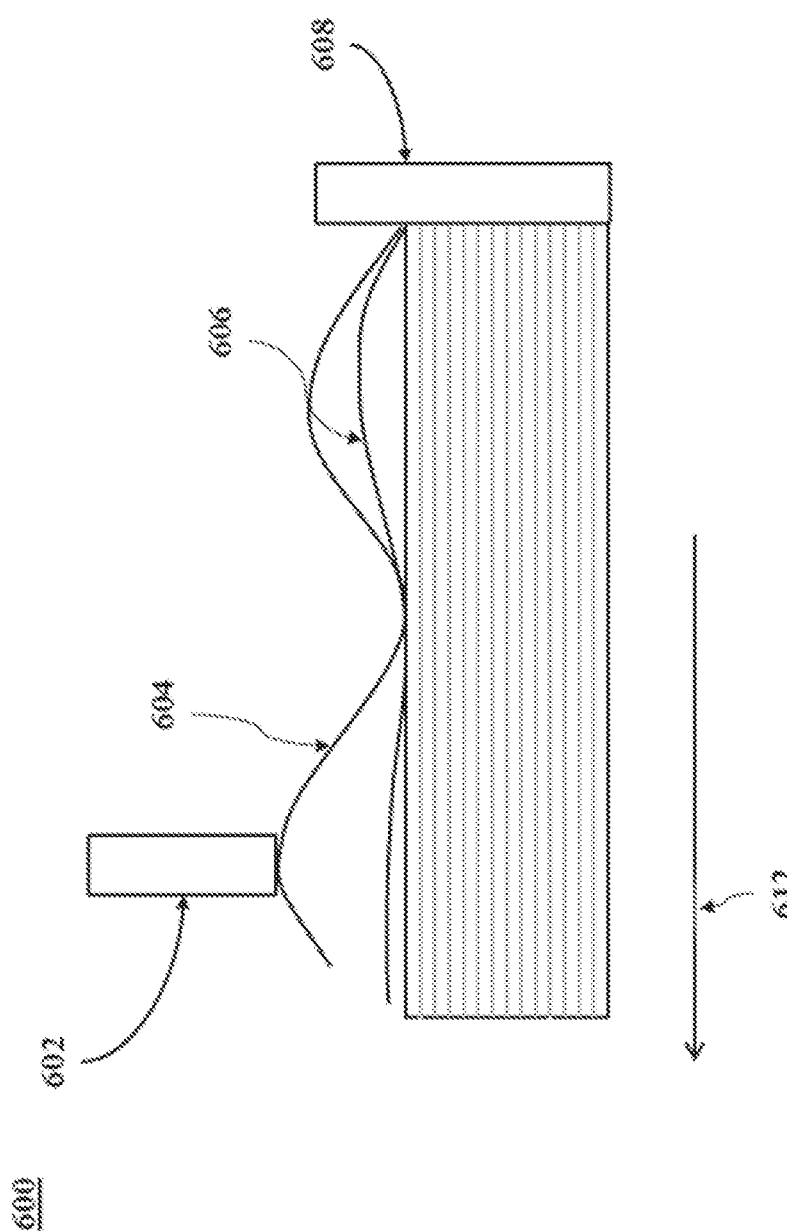
FIG. 6 shows a cross-sectional side view of an exemplary isolation system.

FIG. 6 shows a cross-sectional side view of an exemplary isolation system. In some instances, the isolation system 600 can facilitate accurate isolation of a sheet or a plurality of sheets from other sheets or from a stack of sheets by introducing a sinusoidal wave into the sheet or the plurality of sheets. The isolation system described herein may facilitate isolation of sheets that were previously fastened together by one or more fasteners. In some instances, the isolation system 600 in FIG. 6 can be the same isolation system 400 in FIG. 4 and system 500 in FIG. 5. In some instances, the isolation systems 400, 500, and 600 can be integrated into a single system. In some instances, the isolation systems described herein can be integrated into one or more identification systems described above.

For example, a top sheet 604 and an adjacent sheet 606 to the top sheet can have been previously fastened together via a fastener at one or more fastening locations (e.g., fastening location 508 in FIG. 5). When an initial lifting force is applied to the top sheet 604 by a vacuum lifter 602 or other suction applying device, the top sheet 604 and the adjacent sheet 606 can be connected by a secondary binding or adhesive force at the previous one or more fastening location, such as shown in FIG. 5. The isolation system 600 can be configured to have a direction of sheet transfer in the direction 612.

In some instances, a sinusoidal wave can be introduced into the system 600 by moving the top sheet 604 in a direction substantially opposite the direction of sheet transfer (e.g., direction 612), such as via a linear actuator or other positioning component. In some instances, the positioning component can be coupled to the suction applying device (e.g., vacuum lifter 602) picking the top sheet. One or more rear air providing devices 608 (e.g., air knives) can function as backstops to prevent the top sheet 604 from sliding. By introducing the backwards (e.g., relative to direction 612) linear motion and fixing a base (e.g., edge and/or corner) of the top sheet 604, a sinusoidal wave can be introduced to the top sheet 604. For example, a cross-section of a plane of the top sheet 604 may illustrate a sinusoidal wave. Alternatively, non-sinusoidal waves (e.g., periodic, piecewise linear, etc.) can be generated. In some instances, any type of wave can be generated. When two or more sheets are connected by a secondary binding or adhesive forces at previous fastening locations, and waves are introduced into the sheets (such as via the backstop and the backwards linear motion), each connected, or semi-connected (e.g., via secondary binding force), sheet can wave (or bend to form wave cross-sections) at a different amplitude and/or different frequency, because the top sheet 604 is the only sheet held directly by the lifting force (e.g., via vacuum lifter 602) and therefore each sheet are defined by different boundary conditions.

An introduction of one or more waves can provide a significant separating force to overcome one or more secondary binding or adhesive forces between two or more sheets. In some instances, the process of generating one or more waves for each top sheet 604 can take at most about 120 milliseconds (ms), 100 ms, 80 ms, 70 ms, 60 ms, 50 ms, or less than the above. In some instances, the process can take longer than the above.

In some instances, one or more waves can be generated by lifting and moving the top sheet 604 in any direction substantially parallel to a plane of the top sheet 604 before a lifting force is applied, which direction may or may not be substantially parallel to the direction 612 of sheet transfer. For example, the top sheet can be moved towards or from any edge of the top sheet. One or more air providing devices can be located at an edge towards which the lifted top sheet is moved to function as backstops to prevent the top sheet 604 from sliding. Alternatively, any other device may function as the backstop. In some instances, one or more waves can be generated in a sheet by lifting at least a portion of the sheet and introducing any motion of the lifted sheet substantially towards a fixed base (e.g., edge and/or corner) of the sheet. The motion can be linear or nonlinear. In some instances, at least a portion of the top sheet can be isolated (e.g., lifted) from an adjacent sheet and maintained isolated from the adjacent sheet via applying a suction, pinching, penetrating (and hooking), applying adhesive forces (e.g., via adhesive liquid, biomimetic adhesion, textured adhesion, etc.), and/or a combination thereof or other methods of lifting.

In some instances, a linear actuator or other positioning component (e.g., robot arm) can introduce a vibration and/or pulse to the top sheet to generate one or more waves and/or facilitate isolation of the top sheet from the adjacent sheet via the one or more waves. The vibration or pulse can be generated by providing a shaking motion, a back-and-forth motion, an oscillatory motion, and/or other periodic motions. The motion can be linear or nonlinear. The motion can be a lateral motion which is substantially parallel to a plane of the top sheet when the top sheet is not lifted. The motion can be a vertical motion (e.g., direction of lifting and/or releasing the top sheet). Alternatively, the motion can be a combination of the above and/or a motion having any direction. In some instances, the vibration and/or pulse, and/or a wave formed by the vibration and/or pulse, can have a frequency of at least about 1 hertz (Hz), 5 Hz, 6 Hz, 7 Hz, 8 Hz, 9 Hz, 10 Hz, 20 Hz, 30 Hz, 40 Hz, 50 Hz, 100 Hz, 500 Hz, 1 kilohertz (kHz), 10 kHz, 20 kHz, 30 kHz, 40 kHz, 50 kHz, 60 kHz, 70 kHz, 80 kHz, 90 kHz, 100 kHz, 150 kHz, 200 kHz, 250 kHz, 300 kHz, 350 kHz, 400 kHz, 450 kHz, 500 kHz, or higher. Alternatively, the frequency can be lower than the above.

In some instances, a wave formed by the top sheet 604 can have a maximum amplitude of a maximum dimension of the top sheet. The maximum dimension of the top sheet may be a dimension of the top sheet (e.g., length, width, height, diameter, diagonal, etc.) that is greater than the other dimensions of the top sheet. For example, a wave formed, such as by one or more methods described herein, by the top sheet can have a maximum amplitude of at most about 1 meter (m), 0.9 m, 0.8 m, 0.7 m, 0.6 m, 0.5 m, 0.4 m, 0.3 m, 0.2 m, 0.1 m, 9 centimeters (cm), 8 cm, 7 cm, 6 cm, 5 cm, 4 cm, 3 cm, 2 cm, 1 cm, or less. Alternatively, a wave formed by the top sheet can have a maximum amplitude greater or less than the examples above. In some instances, a difference in maximum amplitude of a wave formed by the top sheet and maximum amplitude of a wave formed by an adjacent sheet of the top sheet can be at most about 1 meter (m), 0.9 m, 0.8 m, 0.7 m, 0.6 m, 0.5 m, 0.4 m, 0.3 m, 0.2 m, 0.1 m, 9 centimeters (cm), 8 cm, 7 cm, 6 cm, 5 cm, 4 cm, 3 cm, 2 cm, 1 cm, or less. Alternatively, the difference between the two maximum amplitudes can be greater or less than the examples above.

In some instances, the isolation systems described herein can isolate any two sheets in a stack of sheets. For example, the two sheets isolated can comprise a first sheet and a second sheet, wherein the first sheet is the top sheet. Alternatively or in addition, neither the first sheet nor the second sheet is the top sheet of the stack. Additional sheets may or may not be grouped above or below the first sheet and/or the second sheet.

Figure 7:
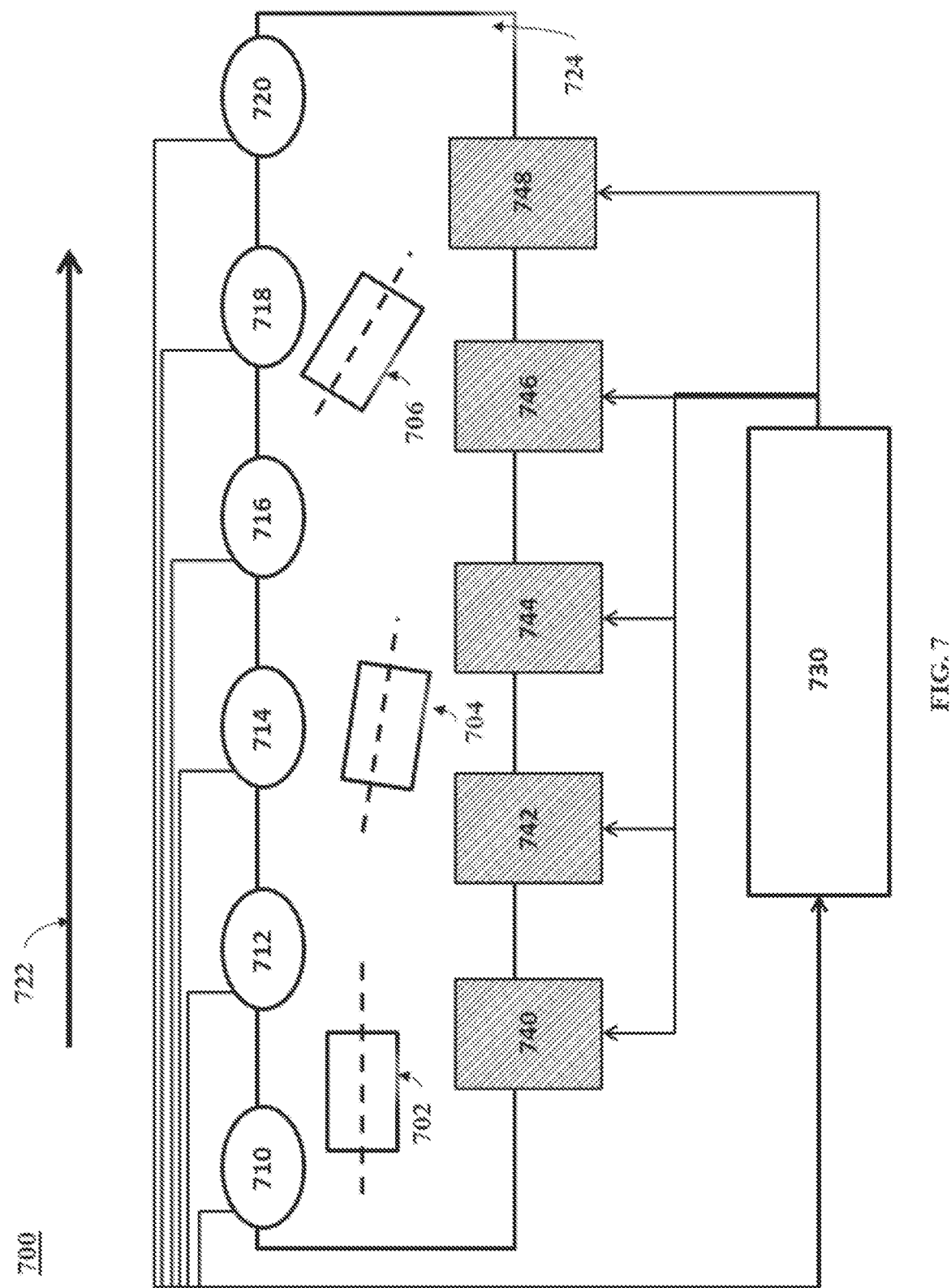
FIG. 7 shows a schematic diagram of an exemplary alignment system.

FIG. 7 shows a schematic diagram of an exemplary alignment system 700. In some instances, the alignment system 700 can facilitate accurate and/or precise alignment of a first sheet relative to a second sheet via machine learning, wherein the first sheet is upstream of the second sheet. The alignment system can correct discrepancies (e.g., systematic error) in performance of one or more hardware of the system over time.

A sheet transfer system can have a direction of sheet transfer 722 wherein each sheet traveling on a conveyor 724 in the sheet transfer system can move from an upstream position to a downstream position. The conveyer can be another transport device or mechanism, such as a track, wheel, belt, moving platform and/or other device or mechanism that can transport a sheet on the conveyer from an upstream position to a downstream position. In some instances, a sheet on the conveyer can be stationary relative to the moving conveyer, and move relative to the ground. In some instances, the conveyer can be a stationary platform, and a sheet on the conveyer can move relative to the stationary platform and/or the ground via one or more transport devices or mechanisms (e.g., via fluid flow, gravity, etc.). The direction 722 can be substantially parallel to a plane of the ground on which the sheet transfer system rests. Alternatively, the direction 722 can be substantially perpendicular to a plane of the ground. Alternatively, the direction 722 can be inclined or declined at one or more angles to a plane of the ground. For example, a first sheet 702 can be upstream of a second sheet 704, and the second sheet can be upstream of a third sheet 706.

A plurality of tools 740, 742, 744, 746, and 748 can each be configured to manipulate a sheet travelling on the conveyer 724 at different upstream/downstream locations. For example, a first tool 740 can be upstream of a second tool 742, the second tool upstream of a third tool 744, the third tool upstream of a fourth tool 746, and the fourth tool upstream of a fifth tool 748. Alternatively, the system 700 may comprise more or fewer tools at different upstream/downstream locations. In some instances, the system 700 may comprise a plurality of tools at a same upstream/downstream location. Each of the plurality of tools 740-748 can correspond to the tool 244 in FIG. 2 and/or other tools (e.g., interaction unit 106 in FIG. 1) described herein. For example, one or more tools of the plurality of tools 740-748 can each be permanently or detachably coupled to a positioning component, such as a linear actuator or a robot arm. Each tool at the same or different upstream/downstream locations can be the same or different type of tools from one another and/or perform the same or different tasks (e.g., lifting, isolating, etc.). A tool at an upstream/downstream location can perform the same task or operation (e.g., lifting) to each sheet passing through the upstream/downstream location.

Each of the plurality of tools 740-748 can be operatively coupled to a controller 730. The controller 730 can correspond to the controller 202 in FIG. 2 and/or other controllers (e.g., controller unit 104 in FIG. 1) described herein. The controller 730 may control one or more tools of the plurality of tools 740-748 individually or collectively by providing individual or collective instructions to the one or more tools. For example, the controller 730 can provide independent and different instructions to the first tool 740 and the second tool 742. While FIG. 7 shows one controller, the controller 730 may comprise a plurality of controllers each directly or indirectly in operative communication with the other. For example, a plurality of controllers can each be operatively communicating with one or more central controllers. For example, each tool may communicate with separate controllers, wherein the separate controllers communicate with a central controller.

A plurality of sensors 710, 712, 714, 716, 718, and 720 can each be configured to detect one or more characteristics of a sheet travelling on the conveyer 724 at different upstream/downstream locations. For example, a first sensor 710 can be upstream of a second sensor 712, the second sensor upstream of a third sensor 714, the third sensor upstream of a fourth sensor 716, the fourth sensor upstream of a fifth sensor 718, and the fifth sensor upstream of a sixth sensor 720. Alternatively, the system 700 may comprise more or fewer sensors at different upstream/downstream locations. In some instances, the system 700 may comprise a plurality of sensors at a same upstream/downstream location. In some instances, the system may comprise a sensor upstream and/or downstream of each of a plurality of tools 740-748. In some instances, the system may comprise at least one sensor between two tools. Each of the plurality of sensors 710-720 can correspond to any sensor (e.g., components of detection unit 102 in FIG. 1, image capture device 230, etc.) described herein.

The plurality of sensors 710-720 can each be a same type of sensor. Alternatively, the plurality of sensors can each be a different type of sensor. Alternatively, the plurality of sensors can be a combination of one or more different types of sensors. For example, the plurality of sensors can comprise a combination of a first set of optical sensors (e.g., image capture device 230 in FIG. 2) and a second set of sets of a sensor array (e.g., double sheet sensors, etc.). For example, for a sheet transfer system comprising five sensor units, the system can comprise three optical sensor units and two sets of sensor arrays (e.g., double sheet sensors). Alternatively, the plurality of sensors can have a different combination that may or may not involve other types of sensors. In some instances, the same type of sensors can be arranged consecutively. In other instances, each of a same type of sensors can be interspersed before, after, and/or between different types of sensors.

Each of the plurality of sensors 710-720 can be configured to detect one more characteristics of a sheet travelling on the conveyer 724. The one or more characteristics of the sheet can be indicative of an alignment of the sheet, such as an orientation and/or a position of the sheet relative to a reference point, reference axis, and/or reference grid. In some instances, the orientation of the sheet can be determined relative to a reference axis. For example, the orientation of a sheet can be represented by an angle between a longitudinal axis of the sheet and the reference axis. The reference axis can be substantially parallel to the direction 722 of sheet transfer. In some instances, the orientation and/or the position of a sheet can be determined by one or more devices (e.g., sensors 710-720) and/or techniques described herein (e.g., with reference to FIG. 1 and FIG. 2). In some instances, the orientation and/or the position of a sheet can be determined for each upstream/downstream location that each of the plurality of sensors 710-720 is located as the sheet travels downstream on the conveyer 724. In some instances, the orientation and/or the position of the sheet can be determined at an upstream/downstream location for each of the plurality of tools 740-748.

Each of the plurality of sensors 710-720 can be operatively coupled to a controller 730. Each of the plurality of sensors may provide the controller with the orientation and/or the position of the sheet. While FIG. 7 shows one controller, the controller 730 may comprise a plurality of controllers each directly or indirectly in operative communication with the other. For example, each sensor may communicate with separate controllers, wherein the separate controllers communicate with a central controller. One or more sensors 710-720 and one or more tools 740-748 can each communicate to the same controller or different controllers that are in direct or indirect communication with each other.

The controller 730 may provide sheet manipulation instructions to one or more of the plurality of tools 740-748 based at least in part on the orientation and/or the position data received from one or more of the plurality of sensors 710-720.

As described above and below herein, a tool may manipulate a sheet based on information collected by an identification system. The controller 730 may determine one or more characteristics of the sheet based on the information. The controller may provide instructions for a downstream tool to manipulate a sheet based on information collected about the sheet from an upstream sensor. For example, a sensor 710 can detect and transmit information about one or more characteristics of a first sheet 702 when the first sheet is at a first location. The controller may, based on the information received from the sensor 710, instruct a tool 740 at a second location to manipulate the first sheet when the first sheet is at the second location. The second location can be downstream from the first location.

Conversely and in addition, the controller may provide sheet manipulation instructions to a tool in an upstream location based on an orientation and/or position data received from a sensor in a downstream location. For example, a sensor 718 in a downstream position to a tool 740 can detect one or more characteristics indicative of an alignment of a third sheet 706 as the third sheet travels downstream past the sensor 718. The sensor 718 can provide data, such as data indicative of an orientation and/or a position of the third sheet 706, to a controller 730. The controller may provide instructions to the tool 740 to manipulate a first sheet 702 that is at an upstream location to the third sheet 706 based at least in part on the data received from the sensor 718. For example, if a desired alignment of a sheet passing through the sheet transfer system comprises a longitudinal axis of the sheet being substantially parallel to the direction 722 of transfer, and the sensor 718 detects that a longitudinal angle of the third sheet has an x angle relative to the direction of transfer, the controller 730 may instruct the tool 740 to manipulate the first sheet 702 and all future sheets to be manipulated by the tool 740 such that the x angle approaches 0°. Alternatively or in addition, the controller may provide instructions to any tool upstream of the sensor 718, such as the tools 740-746 to manipulate a sheet such that the x angle approaches 0°. The controller may iteratively change instructions provided for each upstream tool for each data point(s) received from a downstream sensor of the upstream tool. In some instances, the controller may provide instructions to an upstream tool to manipulate a sheet based at least in part on data received only from an immediately downstream sensor (e.g., tool 748 to sensor 720, tool 746 to sensor 718, tool 740 to sensor 712, etc.). For example, the controller may adjust an input/output timing of an upstream vacuum lifter to adjust an orientation and/or position of a sheet based at least in part on orientation and/or position data received for a downstream sheet.

The controller 730 may receive sensor data from one or more sensors and/or provide instructions to one or more tools in real time. Real-time can include a response time of less than 1 second, tenths of a second, hundredths of a second, or a millisecond. All of processes performed by the controller 730 or any other controller described herein, such as those described above or further below, is capable of happening in real-time.

Beneficially, data collected from sheets at a downstream location can be used to correct an alignment of sheets at a location upstream of the downstream location in real time. An iterative machine learning process can aid in maintaining a desired alignment in real-time. For example, one or more tools (e.g., air actuators, other mechanical elements) may wear and change over time, affecting consistency in performance or adding incremental systematic error to the process. The machine learning process can aid in maintaining consistency and/or correcting any deficiencies in consistency by continuously and iteratively monitoring an upstream action and a downstream result.

One or more systems described herein can be integrated as one system. Alternatively, one or more systems can be integrated as independent systems. For example, one or more identification systems, isolation systems, and/or alignment systems can be integrated as one system or as independent systems. For example, one or more sensors in the alignment system can identify one or more characteristics of a sheet using the identification systems and methods described herein (e.g., vacating a zone of detection, shadow analysis, etc). For example, one or more tools in the alignment system can isolate one or more sheets using the isolation systems and methods described herein (e.g., introducing sinusoidal waves, targeted air provision, etc.). Alternatively, the systems need not be integrated.

The systems and methods described herein can individually or collectively: (1) identify one or more characteristics of a single sheet of a physical document, such as from a stack of physical documents, (2) isolate a single sheet of a physical document, such as from a stack of physical documents, and (3) align one or more sheets of physical documents, such as for scanning. The one or more characteristics identified can include a shape, size (e.g., dimensions), position (e.g., coordinates), orientation, thickness, and/or other characteristics of a sheet.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for isolating sheets, the method comprising:
   (a) providing a backstop adjacent to a stack of a first sheet and a second sheet, wherein the second sheet is adjacent to the first sheet in the stack, wherein the second sheet is previously fastened to the first sheet at a previous fastening location;
   (b) lifting the first sheet by a device capable of suction, wherein a portion of a surface of the first sheet is coupled to a portion of a surface of the second sheet at the previous fastening location by an adhesive force;
   (c) directing the first sheet in a linear motion towards the backstop, wherein the linear motion is interrupted by the backstop; and
   (d) isolating the first sheet from the second sheet, wherein the first sheet forms a first wave and the second sheet form a second wave, wherein the first wave and the second wave have different amplitudes.

2. The method of claim 1, wherein the first wave and the second wave have different frequencies.

3. The method of claim 1, wherein the linear motion is in a direction opposite a direction of sheet transfer.

4. The method of claim 3, further comprising, subsequent to isolating, transferring the first sheet, via the device capable of suction, in the direction of sheet transfer.

5. The method of claim 1, wherein the adhesive force is a static friction force or a lifting force applied by the device capable of suction.

6. The method of claim 1, further comprising isolating the first sheet from a third sheet previously fastened to the first sheet, wherein the third sheet is adjacent to the second sheet.

7. The method of claim 6, wherein the third sheet forms a third wave, and wherein the third wave and the first wave have different amplitudes or frequencies.

8. The method of claim 1, wherein the first sheet and the second sheet are previously fastened at the previous fastening location via a staple.

9. The method of claim 1, wherein the device capable of suction is a vacuum lifter.

10. The method of claim 1, further comprising subjecting the stack to vibration or pulsation.

11. A system for isolating sheets, comprising:
    a backstop adjacent to a stack of the first sheet and the second sheet, wherein the second sheet is adjacent to the first sheet in the stack, wherein the second sheet is previously fastened to the first sheet at a previous fastening location, wherein a portion of a surface of the first sheet is coupled to a portion of a surface of the second sheet at the previous fastening location by an adhesive force;
    a device capable of suction; and
    a controller in operative communication with the device capable of suction, configured to:
    direct the device capable of suction to lift the first sheet;
    direct the first sheet in a linear motion towards the backstop, such that the linear motion is interrupted by the backstop, thereby isolating the first sheet from the second sheet, wherein subsequent to interruption by the backstop, the first sheet forms a first wave and the second sheet form a second wave, wherein the first wave and the second wave have different amplitudes.

12. The system of claim 11, wherein the first wave and the second wave have different frequencies.

13. The system of claim 11, wherein the linear motion is in a direction opposite a direction of sheet transfer.

14. The system of claim 13, wherein the controller is further configured to, subsequent to the isolating, transferring the first sheet, via the device capable of suction, in the direction of sheet transfer.

15. The system of claim 11, wherein the adhesive force is a static friction force or a lifting force applied by the device capable of suction.

16. The system of claim 11, wherein the controller is further configured to isolate the first sheet from a third sheet previously fastened to the first sheet, wherein the third sheet is adjacent to the second sheet.

17. The system of claim 16, wherein subsequent to interruption by the backstop, the third sheet forms a third wave, and wherein the third wave and the first wave have different amplitudes or frequencies.

18. The system of claim 11, wherein the first sheet and the second sheet are previously fastened at the previous fastening location via a staple.

19. The system of claim 11, wherein the device capable of suction is a vacuum lifter.

20. The system of claim 11, wherein the controller is further configured to direct one or more tools to subject the stack to vibration or pulsation.

* * * * *